(12) United States Patent
Kuo et al.

(10) Patent No.: US 7,626,651 B2
(45) Date of Patent: Dec. 1, 2009

(54) METHOD FOR MANUFACTURING AN LCD DEVICE DEFINING A TFD STRUCTURE USING A SECOND MASK REMOVING A FIRST METAL LAYER, AN INSULATING LAYER AND A SECOND METAL LAYER TO EXPOSE A TRANSPARENT ELECTRODE LAYER

(75) Inventors: Wei-Hung Kuo, Hsin-Chu (TW);
Ko-Chin Yang, Hsin-Chu (TW);
Weng-Bing Chou, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 433 days.

(21) Appl. No.: 11/715,427

(22) Filed: Mar. 8, 2007

(65) Prior Publication Data

US 2008/0106690 A1    May 8, 2008

(30) Foreign Application Priority Data

Nov. 8, 2006    (TW) .............................. 95141307 A

(51) Int. Cl.
*G02F 1/136* (2006.01)
(52) U.S. Cl. .............................. 349/50; 349/51; 349/52
(58) Field of Classification Search ............ 349/49–53, 349/187
See application file for complete search history.

(56) References Cited

U.S. PATENT DOCUMENTS 5,883,683 A * 3/1999 Yamaue et al. ................. 349/49
5,893,621 A * 4/1999 Sekiguchi ..................... 349/51
5,963,279 A * 10/1999 Taguchi ....................... 349/54

* cited by examiner

*Primary Examiner*—John Heyman
(74) *Attorney, Agent, or Firm*—Bacon & Thomas, PLLC

(57) ABSTRACT

A method for manufacturing a liquid crystal display device is disclosed, comprising the following steps: (a) providing a substrate having a transparent electrode layer and a first metal layer, wherein the transparent electrode layer is sandwiched in between the first metal layer and the substrate; (b) defining a patterned area having a thin film diode area and a pixel area by a first mask; (c) forming a first insulating layer and a second metal layer on the patterned area having the thin film diode area and the pixel area in sequence, wherein the first insulating layer is sandwiched in between the second metal layer and the first metal layer; and (d) defining the thin film diode area and the pixel area by a second mask, and removing the second metal layer, the first insulating layer, and the first metal layer on the pixel area to expose the transparent electrode layer.

20 Claims, 29 Drawing Sheets

A-B

METHOD FOR MANUFACTURING AN LCD DEVICE DEFINING A TFD STRUCTURE USING A SECOND MASK REMOVING A FIRST METAL LAYER, AN INSULATING LAYER AND A SECOND METAL LAYER TO EXPOSE A TRANSPARENT ELECTRODE LAYER

BACKGROUND OF THE INVENTION

1. Field of the Invention

The present invention relates to a method for manufacturing a liquid crystal display device, more particularly, to a method for manufacturing a liquid crystal display device having a thin film diode as a switch element.

2. Description of Related Art

In general, a thin film transistor (TFT) is used as a pixel switch element for an active LCD device, and a TFT exhibits the high on/off current ratio ($>10^6$) to display images with improved quality. However, the process for preparing a TFT usually requires five to six masking steps. The process for preparing a TFT is complex and the yield is reduced. Thereby, those skilled in the field focus on reducing the steps and enhancing the yield.

The idea that a thin film diode (TFD) is used as a pixel switch element was brought up in 1983. The process for preparing a TFD requires three masking steps, and thereby the manufacturing process of a TFD is simpler than that of a TFT. A TFD comprises a selective line extending to a pixel area, a pixel electrode overlapped by the selective line, and a semi-insulating layer sandwiched between the selective line and the pixel electrode. The area of the three-layered structure is the area of a TFD. The driving action is performed by applying a voltage to the selective line to turn on the TFD, and thereby the pixel signal can be written to the pixel area. In addition, a black matrix of the color filter covering the TFD area can protect the semi-insulating layer from light that would affect electrical properties of the TFD.

U.S. Pat. No. 5,204,764 discloses that a TFD of a Metal-Insulator-Metal (MIM) structure is used in combination with a dual selective line to drive an LCD device so as to improve the display quality, as shown in FIG. 1. However, the area of the TFD for the TFD display device disclosed by U.S. Pat. No. 5,204,764 has to be increased to make the driven current large enough, and thereby the treatment reduces the aperture ratio of the pixel area. In addition, since the material of the upper metal layer is different from that of the lower metal layer, the current-voltage (I-V) characteristic of the thin film diode is asymmetrical, resulting in a poor display quality.

U.S. Pat. No. 6,243,062 discloses a structure of two back-to-back thin film diodes to improve the I-V symmetry (as shown in FIG. 2). Although the method disclosed by U.S. Pat. No. 6,243,062 can efficiently improve the I-V symmetry, the manufacturing process comprises one more step and the aperture ratio is reduced.

According to one of the conventional methods, a metal layer, a transparent electrode layer, and a semi-insulating layer are coated in sequence, and a selective line is defined by a first masking step; subsequently, a photosensitive polymer insulating film is deposited, and then the TFD area is defined by a second masking step, and a transparent electrode layer is deposited; and then a pixel area and a thin film diode are accomplished by a third masking step, as the structure shown in FIG. 3. The conventional method can resolve the issue of asymmetrical I-V characteristic and enhances the breakdown voltage. However, the process of the conventional method still comprises three masking steps, and thereby the issue of complex processing is not resolved.

SUMMARY OF THE INVENTION

The object of the present invention is to provide a method for manufacturing a liquid crystal display (LCD) device to resolve the issues of the insufficient aperture ratio and the asymmetrical current-voltage characteristic, and the LCD device having a TFD as a switch element can be accomplished by using only two masking steps.

In the present invention, the TFD area overlaps the selective line, and is not in the display area. Thereby, the selective line functions as the element communicating the signal and the component of the TFD. In addition, owing to there being no switch elements in the display area, the aperture ratio can be improved. Furthermore, the material of the first metal layer is the same as that of the second metal layer of the TFD of the present invention, so the TFD exhibits the symmetrical current-voltage characteristic. The area of the TFD of the present invention can be greatened without affecting the aperture ratio to raise the driven current, and accelerate the pixel charging.

The present invention provides a process for manufacturing an LCD device, comprising: (a) providing a substrate having a transparent electrode layer and a first metal layer thereon, wherein the transparent electrode layer is sandwiched in between the substrate and the first metal layer; (b) defining a patterned area having a TFD structure area and a pixel area by use of a first mask; (c) forming a first insulating layer and a second metal layer on the substrate in sequence, wherein the first insulating layer is sandwiched between the second metal layer and the first layer; and (d) defining the TFD structure area and the pixel area, and removing the first metal layer, the first insulating layer, and the second metal layer on the pixel area by use of a second mask to expose the transparent electrode layer. According to the aforementioned process of the present invention, the step (a) can further comprise a step for forming a second insulating layer on the first metal layer to thicken the insulating layer.

The present invention further provides another process for manufacturing an LCD device, comprising: (a) providing a substrate having a transparent electrode layer, a first metal layer, and a first insulating layer thereon, wherein the transparent electrode layer is sandwiched between the substrate and the first metal layer, and the first metal layer is sandwiched between the first insulating layer and transparent electrode layer; (b) defining a patterned area having a TFD structure area and a pixel area by use of a first mask; (c) forming a second insulating layer and exposing the patterned area having the TFD structure area and the pixel area; (d) forming a second metal layer over the second insulating layer and the patterned area having the TFD structure area and the pixel area; and (e) defining the TFD structure area and the pixel area, and removing the second metal layer, the first insulating layer, and the first metal layer by use of a second mask on the pixel area to expose the transparent electrode layer.

In addition, the material of the transparent electrode on the substrate can be any transparent conductive material. Preferably, the material of the transparent electrode layer is ITO or IZO. The material of the first metal layer and the second metal layer can be any suitable metal material. Preferably, the material of the first metal layer and the second metal layer is metal with low resistance, such as tantalum. The material of the insulating layer of the present invention can be any insulating material. Preferably, the material of the insulating layer is SiNx.

In the step (b) of the present invention, in addition to defining the patterned area having the TFD structure area and the pixel area, a patterned signal line can be defined simultaneously. According to the method of the present invention, the TFD structure area can overlap the part patterned signal line of the LCD device.

The process for defining the patterned area having the TFD structure area and the pixel area of the step (c) is performed by backside exposure. The material of the insulating layer of the step (c) can be any suitable insulating material. Preferably, the material of the insulating layer is SiNx, SiO$_2$, positive photoresist, or negative photoresist.

According to the LCD device accomplished by the process of the present invention, each different TFD structure area overlaps each different signal line on the same pixel.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
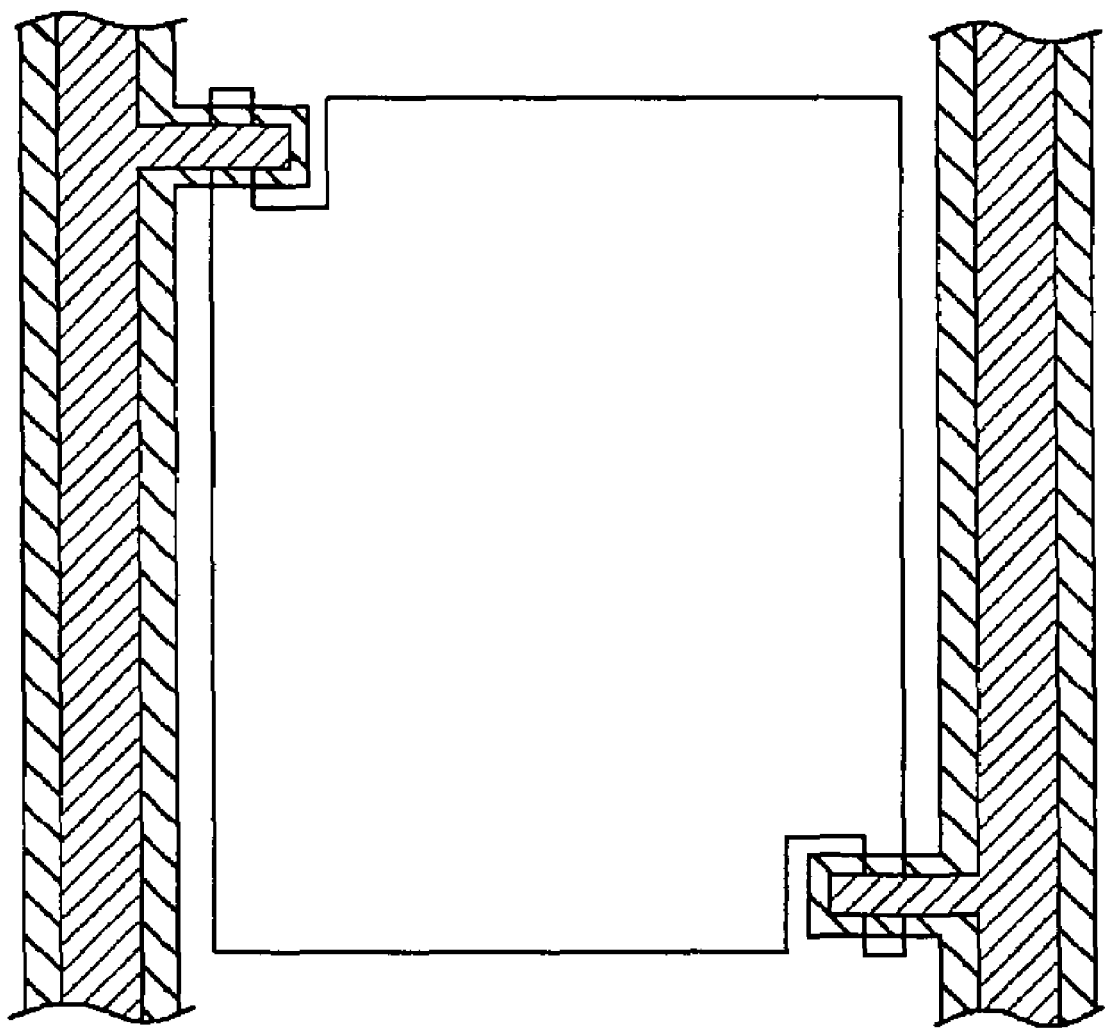
FIG. 1 is a chart of a conventional TFD structure of a metal-insulator-metal structure.
Figure 2:
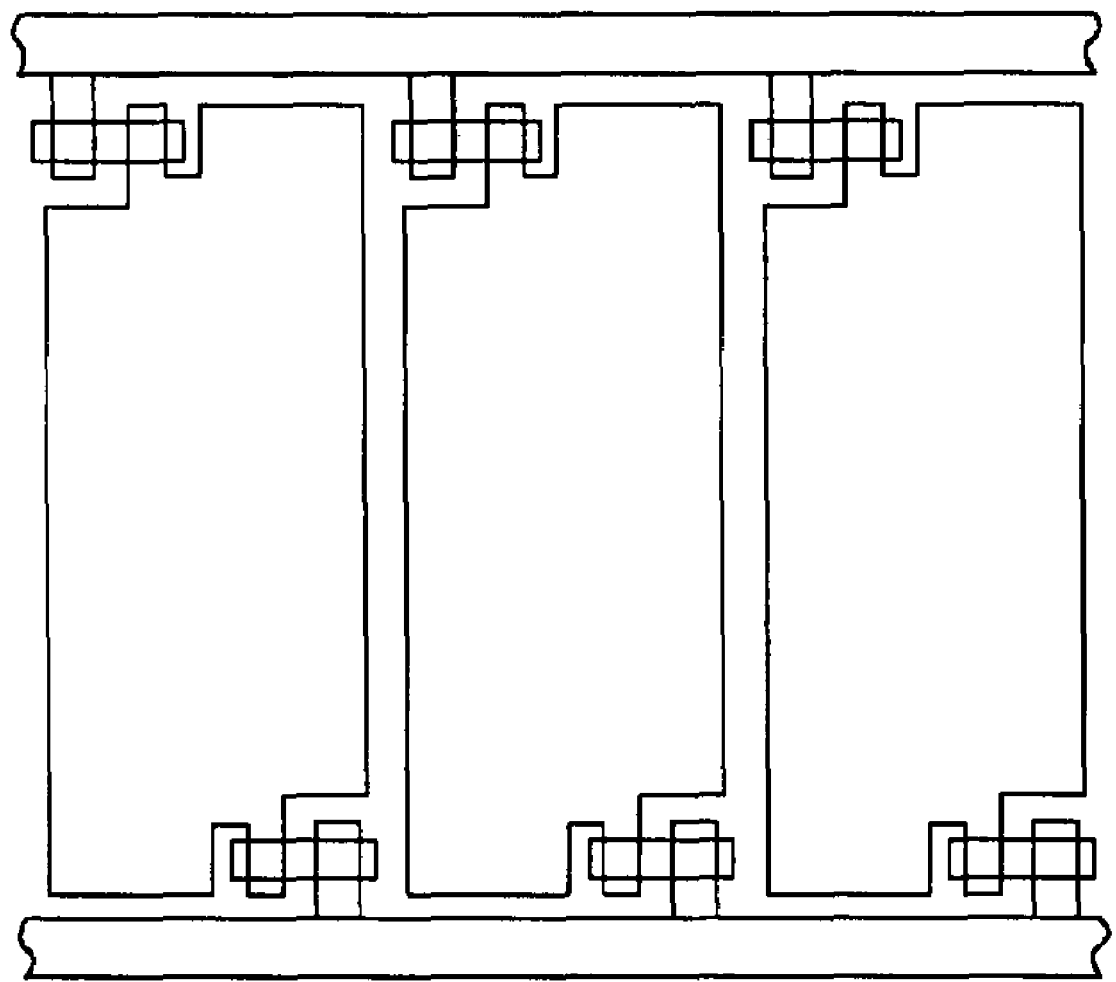
FIG. 2 is a chart of a conventional TFD structure of a back-to-back structure.
Figure 3:
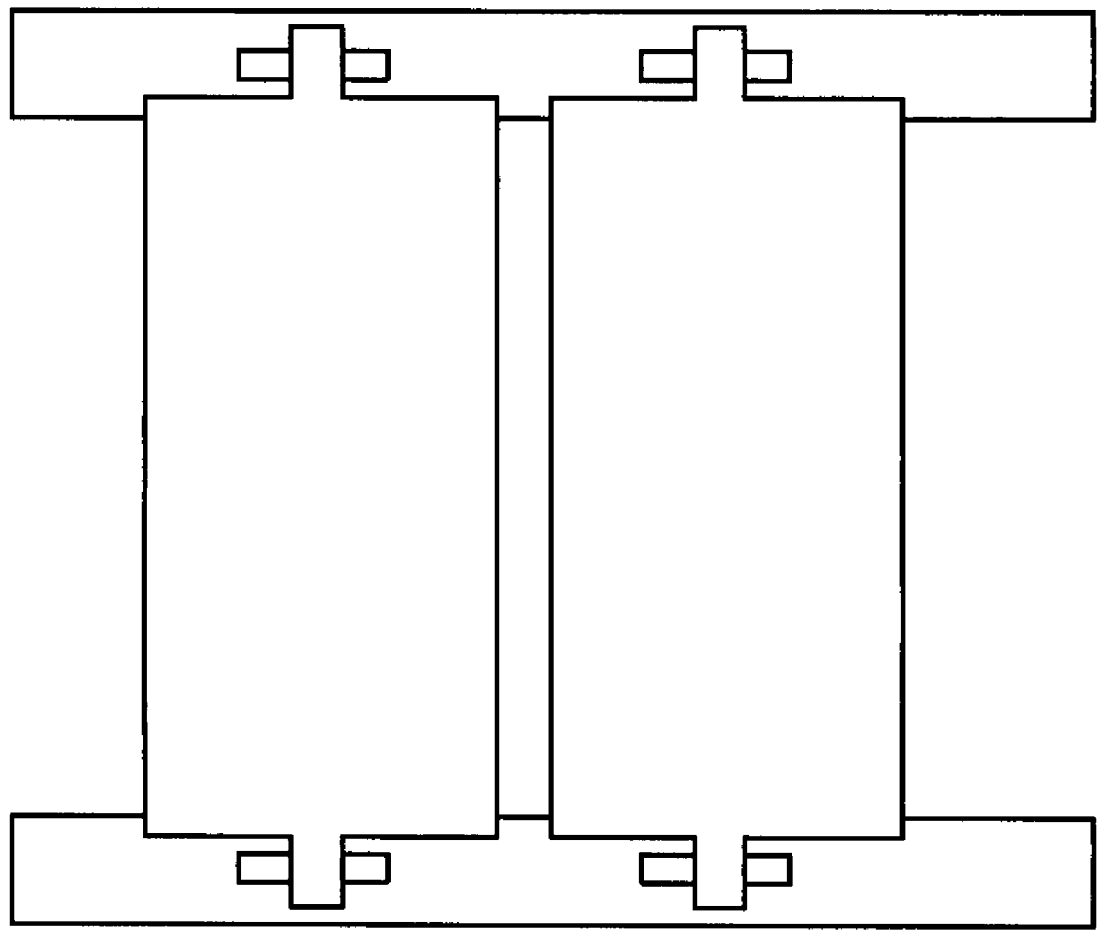
FIG. 3 is a chart of a conventional TFD structure.

Generally, the relationship between the voltage and the current of a thin film diode can be shown as the following equation (1).

$$I = \alpha V A e^{\sqrt{V} \beta (\frac{1}{d})^{\frac{1}{2}}} \quad (1)$$

I: current value through a thin film diode
V: applied voltage value to both terminals of a thin film diode
A: area of a thin film diode
d thickness of an insulator layer
α, β: constant;

For example, when the area of a thin film diode is increased from $A_0$ to $A_1$, it is known by the equation (1) that the current is thereby increased to $A_1/A_0$-fold.

The equation about liquid crystal charge of an active LCD device comprising a thin film diode can be shown as the following equation (2).

$$V = V_0 \left(1 - e^{-\frac{\tau}{RC}}\right) \quad (2)$$

$V_0$: final voltage value during liquid crystal charge
τ: charge time, related to the resolution of a panel
R: line resistance value (including TFD resistance value)
C: liquid crystal capacitance
R is about equal to the addition of line resistance value ($R_{line}$) and TFD resistance value for two TFDs in parallel connection ($R_{diode}=V_{diode}/I_{diode}$), as the equation (3).

$$R = R_{line} + \frac{R_{diode}}{2} = R_{line} + \frac{V_{diode}}{2I_{diode}} \quad (3)$$

Thereby, if it is assumed that liquid crystals are charged to the voltage as large as the 90% final voltage at least, as shown in the equation (4), $$0.9V_0 \leq V_0\left(1 - e^{-\frac{\tau}{RC}}\right) \quad (4)$$

$I_{diode}$ value can be obtained by substituting the equation (3) into the equation (4), as the equation (5).

$$I_{diode} \geq \frac{1}{2} \frac{C_{LC} V_{diode} \ln 0.1}{\tau - C_{LC} R_{line} \ln 0.1} \quad (5)$$

According to the equation (5), it is known that when the panel resolution is increased (τ is reduced) or line resistance ($R_{line}$) is larger, the larger current through the TFD is required so as to charge liquid crystals completely during the turn-on period. The present invention can enhance the area of the TFD and the driven-current by making the TFD overlap on the selective line directly, without the effect on aperture ratio of the pixel.

Embodiment 1

Figure 4A:
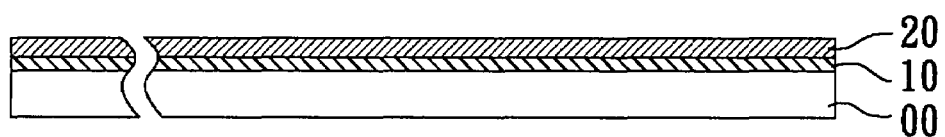
FIGS. 4A to 4D are charts of a manufacturing process of a preferred embodiment (Embodiment 1) of the present invention.
Figure 4A:
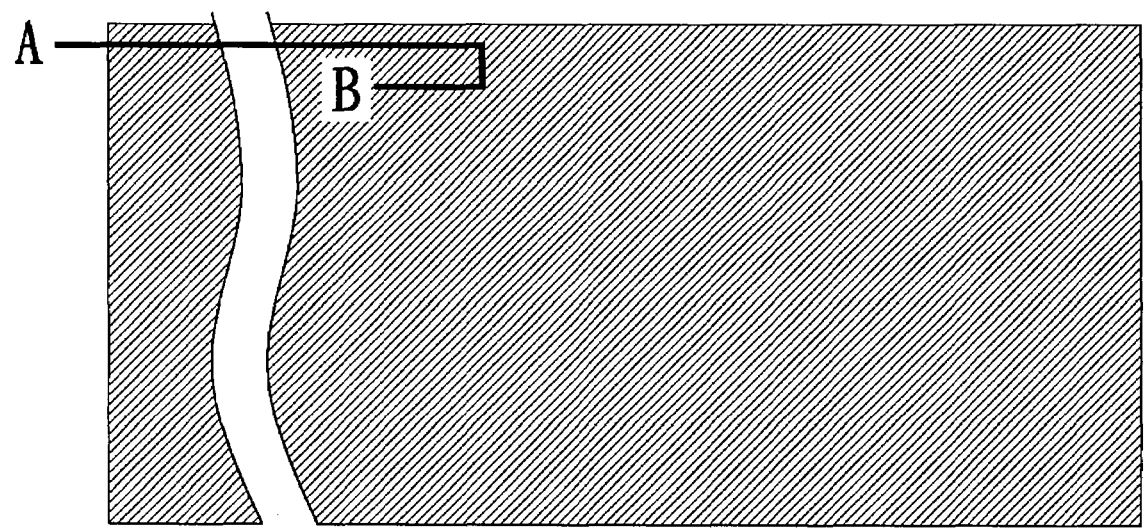

FIGS. 4A-4D are charts for the manufacturing process of a preferred embodiment of the present invention. In each figure, the lower figure is a top view, and the upper figure is a cross-section view of the line A-B area. As shown in FIG. 4A, a transparent electrode layer 10 (such as ITO), and a first metal layer 20 with low resistance (such as Ti) are formed on a substrate 00 in sequence. The transparent electrode layer 10 functions as a pixel electrode, and thereby the material of the transparent electrode layer 10 can be ITO, IZO, or other transparent conductive materials. The first metal layer 20 functions as the lower metal layer of a thin film diode to communicate the signal to the pixel electrode. Preferably, the material of the first metal layer 20 is Ti, Mo, or other metals.

Figure 4B:
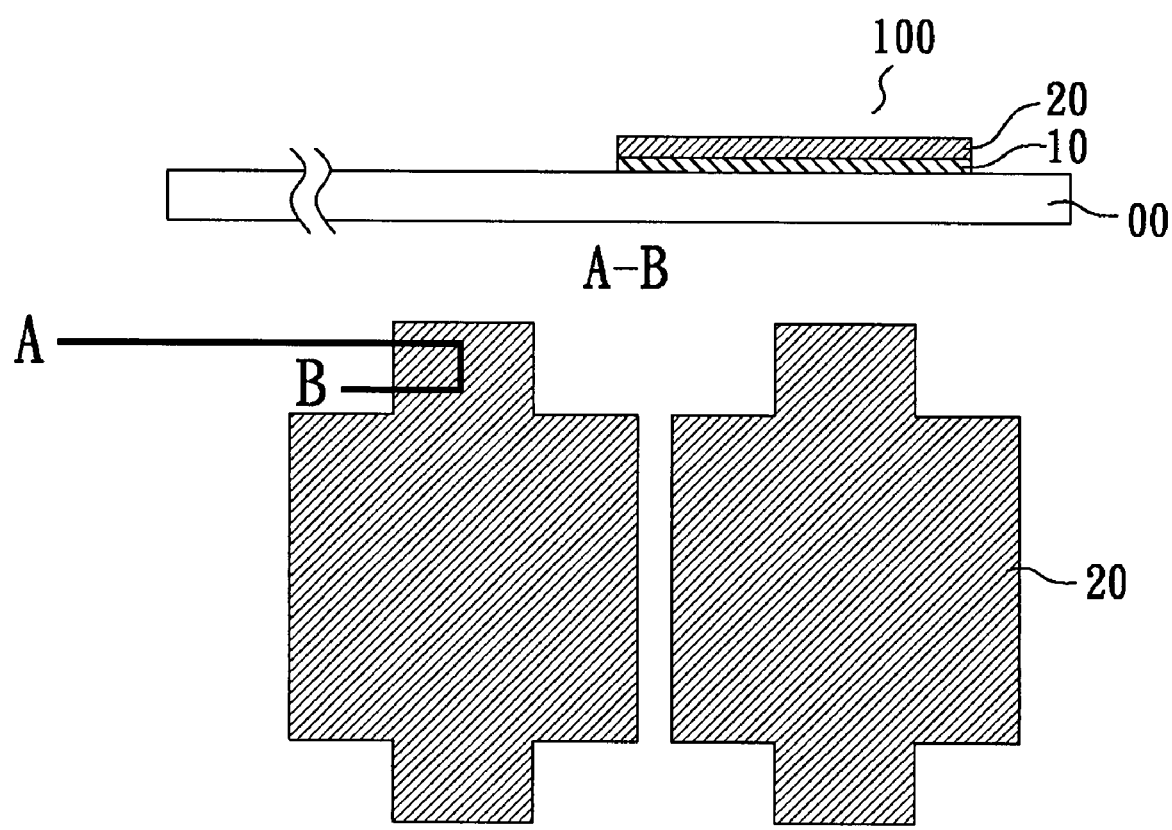

Subsequently, a photoresist layer is formed (not shown in the figures), and a patterned area 100 having both a thin film diode area and a pixel area is defined by a first mask, as the structure shown in FIG. 4B.

Figure 4C:
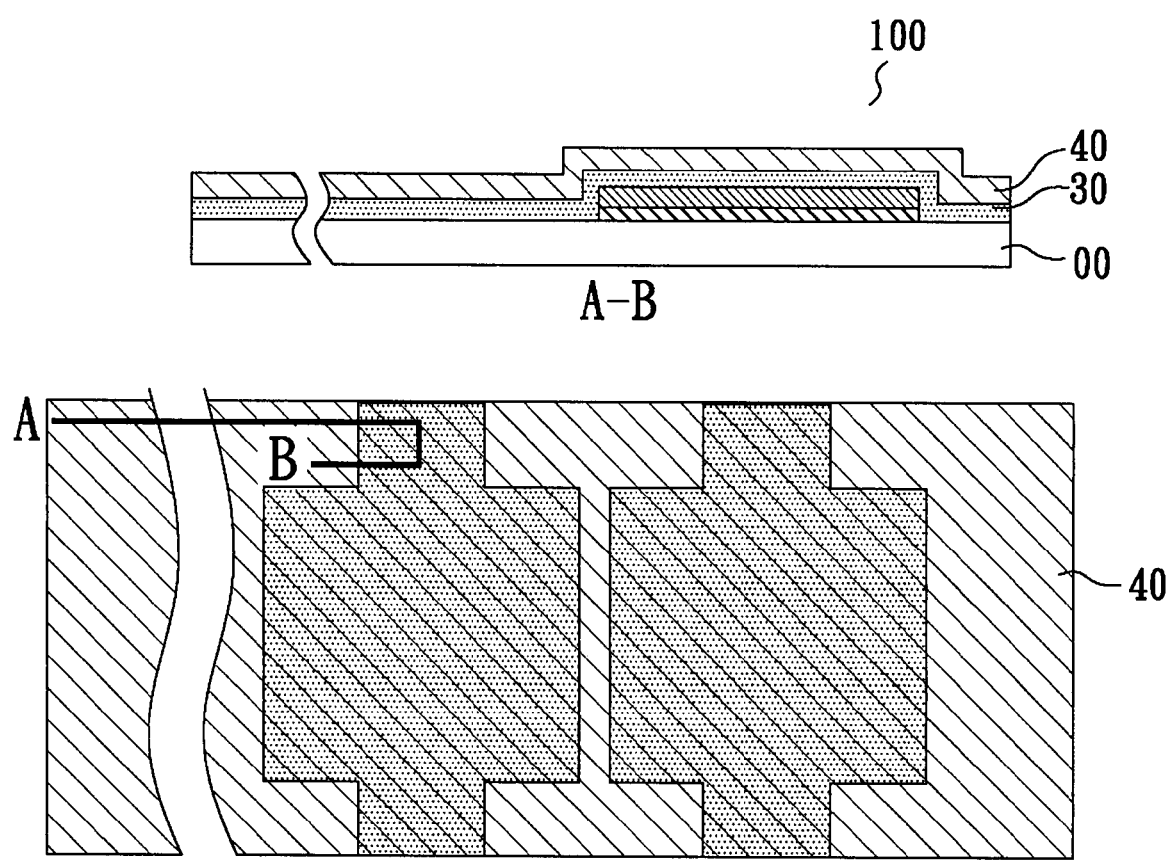
Figure 4D:
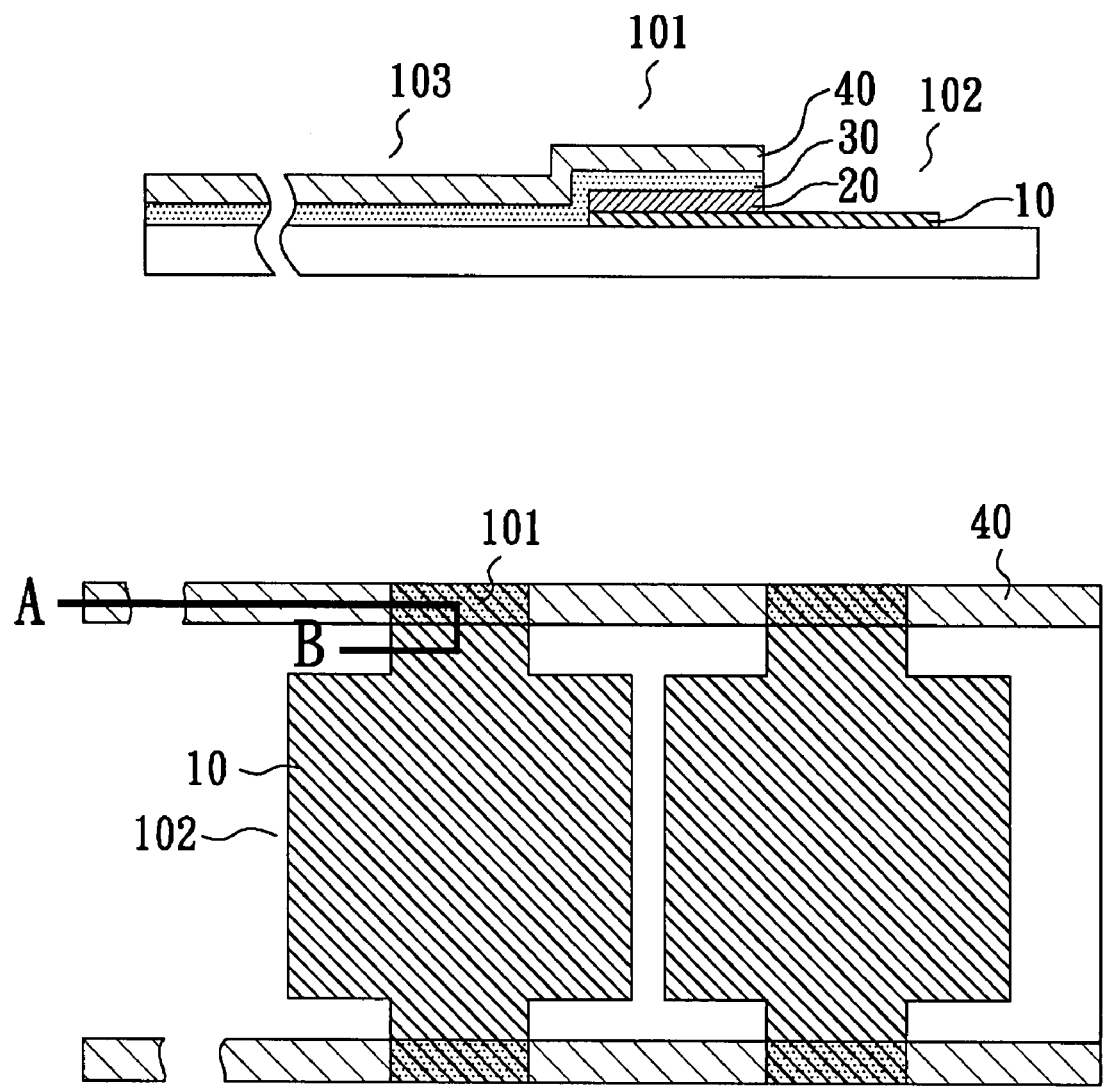

After the patterned area 100 having both the thin film diode area and the pixel area is defined, a first insulating layer 30 (such as SiNx), and a second metal layer 40 with low resistance (such as Ti) are formed over the surfaces of the substrate and the first metal layer 20, as shown in FIG. 4C. Since the condition of the insulating layer 30 would affect the current-voltage characteristic of the thin film diode, the condition of the process has to be regulated to provide the best quality. The second metal layer 40 is both the upper metal layer of the thin film diode, and the pathway for communicating the IC output signal as well. The material of the second metal layer 40 can be Ti, Ti/Al, Mo, or other metals to reduce the resistance, and the RC delay is thereby reduced.

After a photoresist layer is applied on the second metal layer 10 (not shown in FIG. 4D), the TFD structure area 101 and the pixel area 102 are defined by a second mask. The first metal layer 20, the first insulating layer 30, the second metal layer 40 on the transparent electrode 10 in the pixel area 102, the first insulating layer 30, and the second metal layer 40 surrounding the pixel area 102 are removed by etching to insulate each pixel area, and thereby the preparation of the array is accomplished, as the structure shown in FIG. 4D. The leakage area of the array can be blocked by a black array of the color filter.

Embodiment 2

In Embodiment 1, the first insulating layer 30 on the TFD structure area 101 is as thick as the first insulating layer 30 in the side area 103. In order to control the electrical property more easily, the first insulating layer 30 on the TFD structure area 101 can be thickened without affecting the thickness of the first insulating layer 30 in the side area 103, please refers to FIGS. 5A to 5D.

Figure 5A:
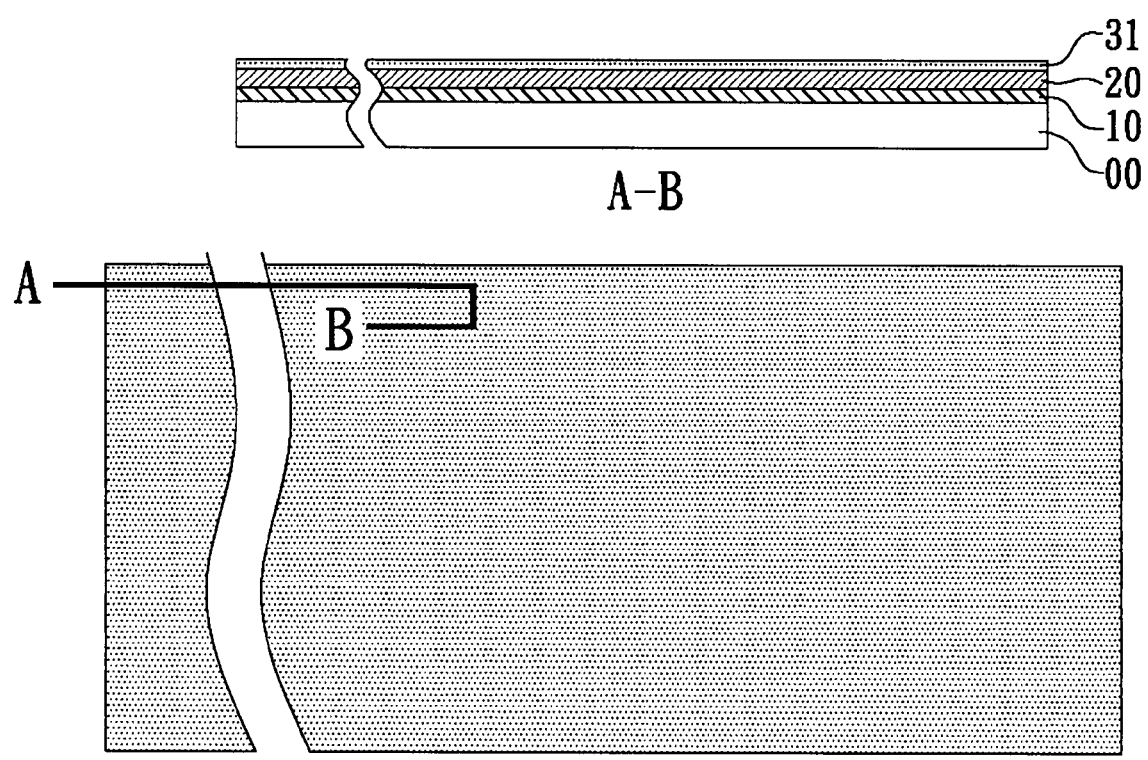
FIGS. 5A to 5D are charts of a manufacturing process of a preferred embodiment (Embodiment 2) of the present invention.
Figure 5B:
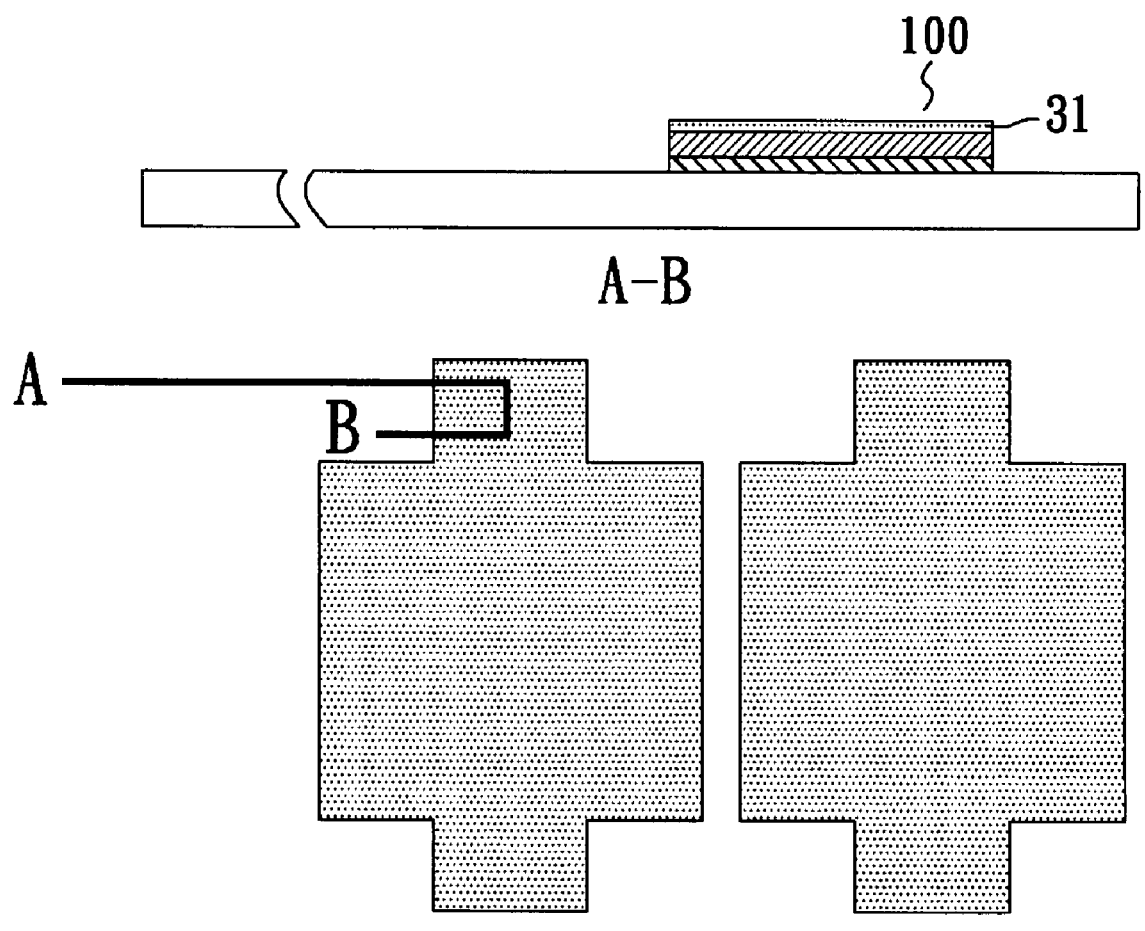
Figure 5C:
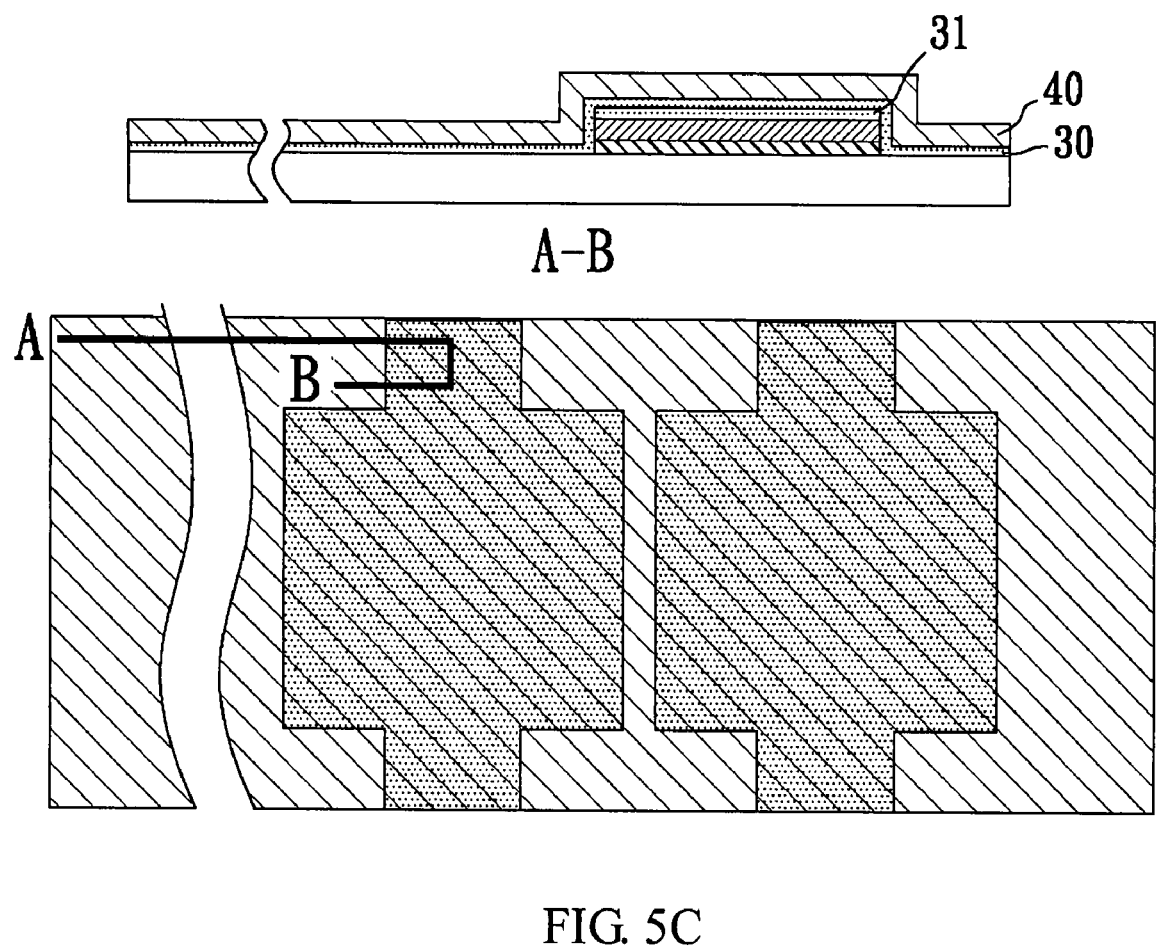
Figure 5D:
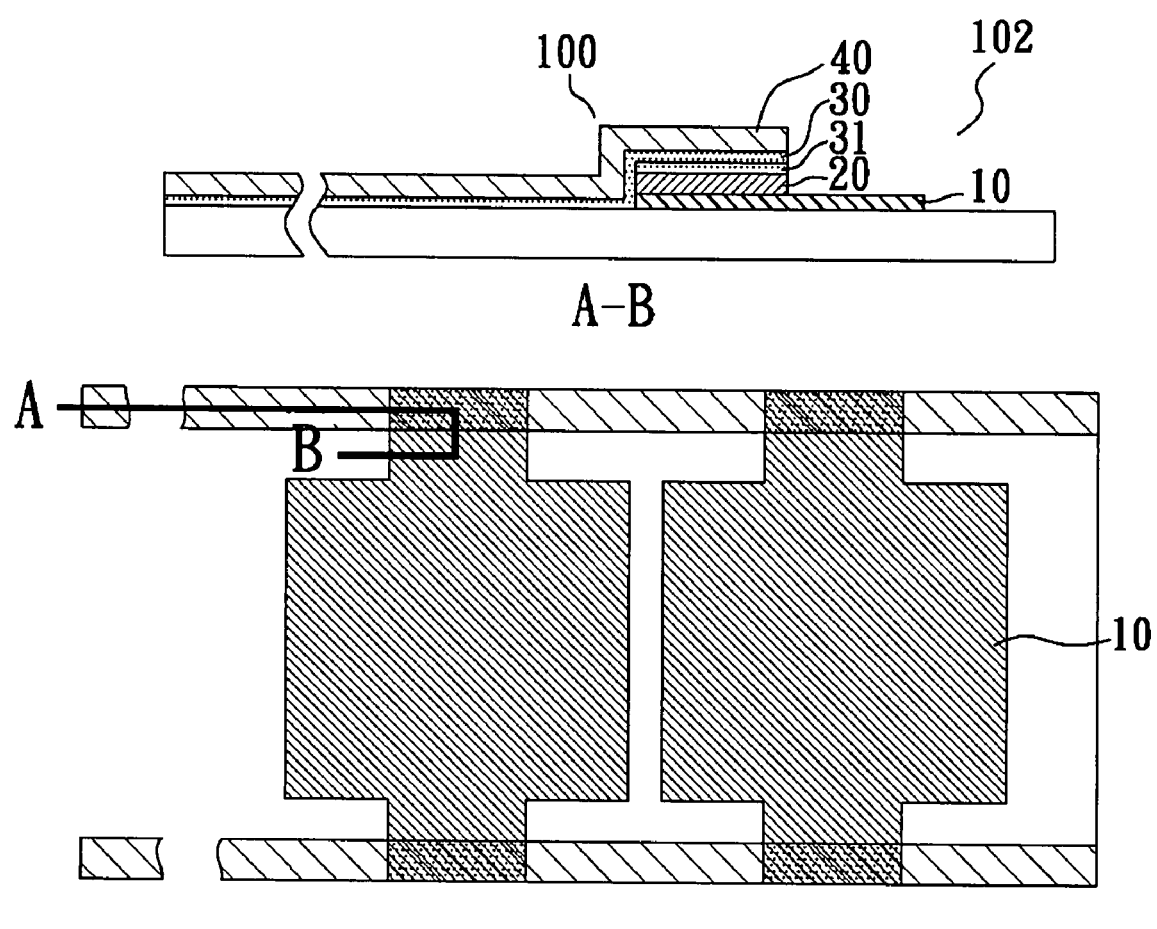

As shown in FIG. 5A, after a transparent electrode layer 10 and a first metal layer 20 are formed on a substrate 00, a second insulating layer 31 is further formed on the first metal layer 20. A patterned area 100 having a TFD structure area and a pixel area is defined by a first mask, as shown in FIG. 5B. Subsequently, a first insulating layer 30, and a second metal layer 40 are formed over the substrate 00, as shown in FIG. 5C. Finally, the TFD structure area 101 and the pixel area 102 are defined by a second mask and etching to accomplish the process for preparing the array, as shown in FIG. 5D.

Embodiment 3

In Embodiment 1, the first insulating layer 30 on the TFD structure area 101 is as thick as the first insulating layer 30 in the side area 103. In order to inhibit the insufficient breakdown voltage of the element resulting from the insufficient thickness of the side area 103, the present embodiment provides a process for preparing a TFD structure, as shown in FIGS. 6A to 6F.

Figure 6A:
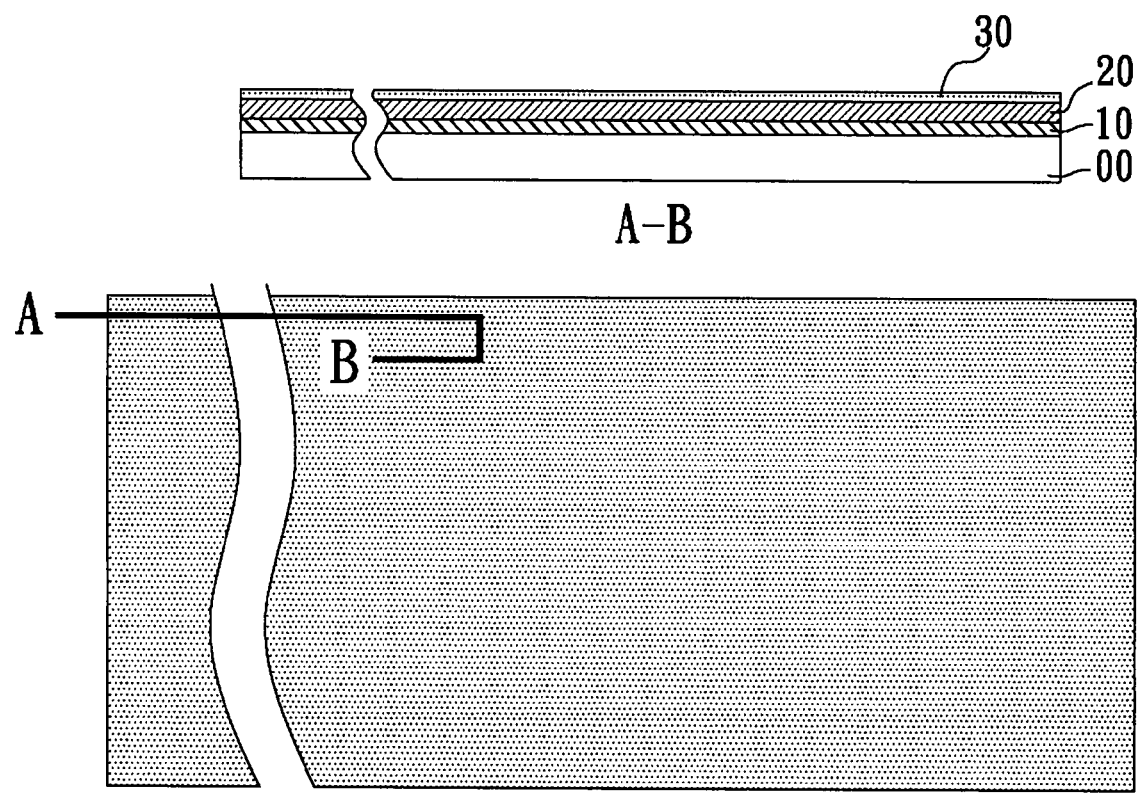
FIGS. 6A to 6F are charts of a manufacturing process of a preferred embodiment (Embodiment 3) of the present invention.
Figure 6B:
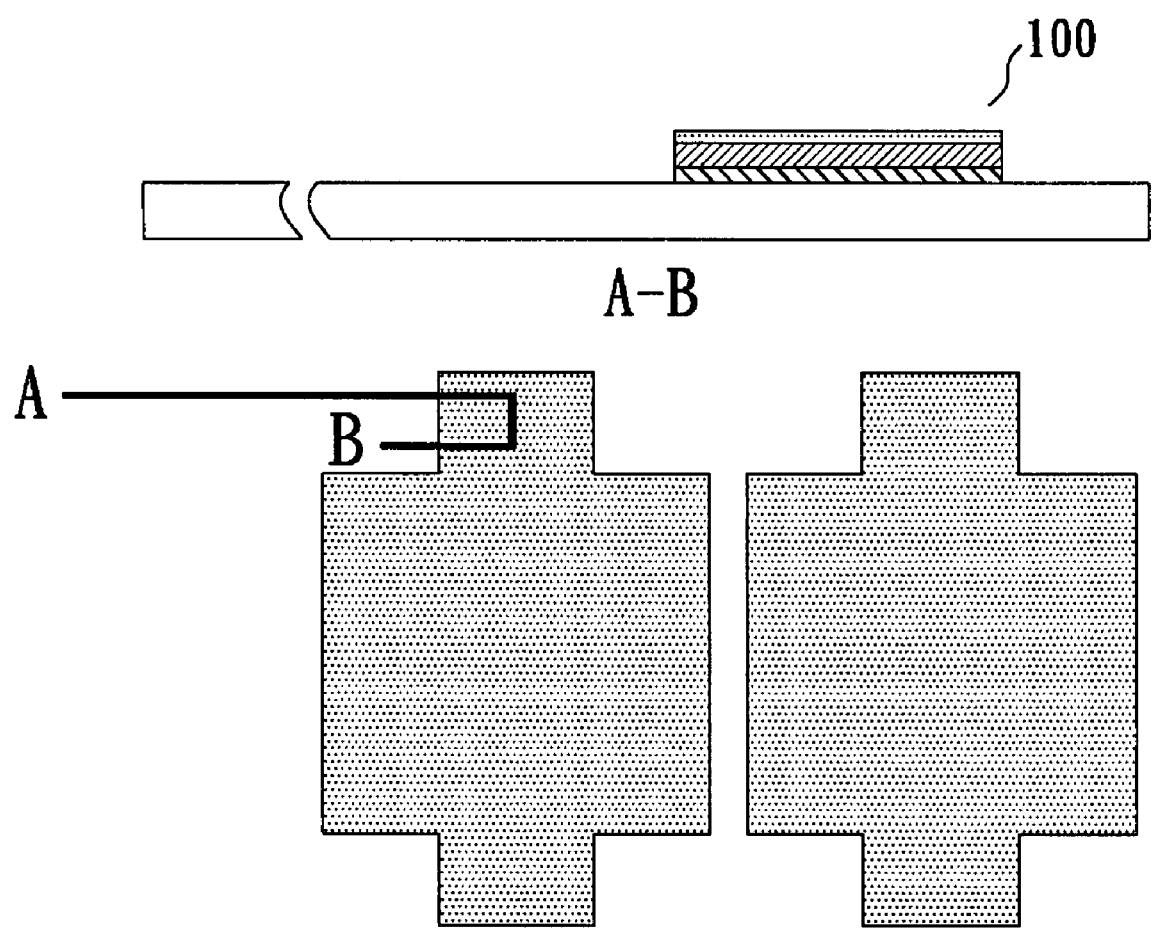
Figure 6C:
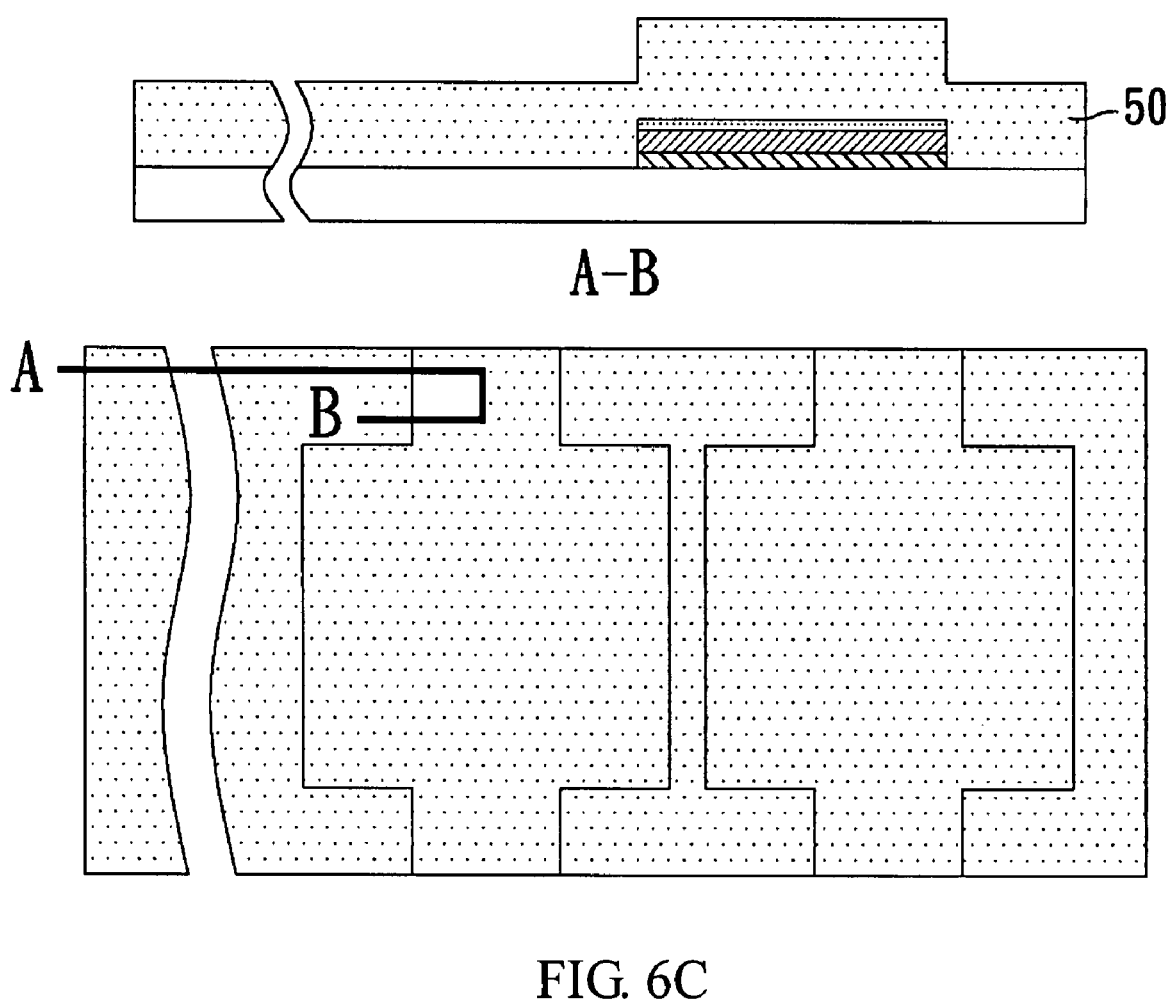

As shown in FIG. 6A, a transparent electrode layer 10, a first metal layer 20 and a first insulating layer 30 are formed on a substrate in sequence first. As shown in FIG. 6B, a patterned area 100 having both a TFD structure area and a pixel area is defined by a first mask. Then, a second insulating layer 50 (such as SiNx or SiO$_2$ with a preferred insulating property) formed over the substrate 00, as shown in FIG. 6C. Preferably, the second insulating layer 50 is thicker than the combination of the transparent electrode layer 10, the first metal layer 20 and the first insulating layer 30.

Figure 6D:
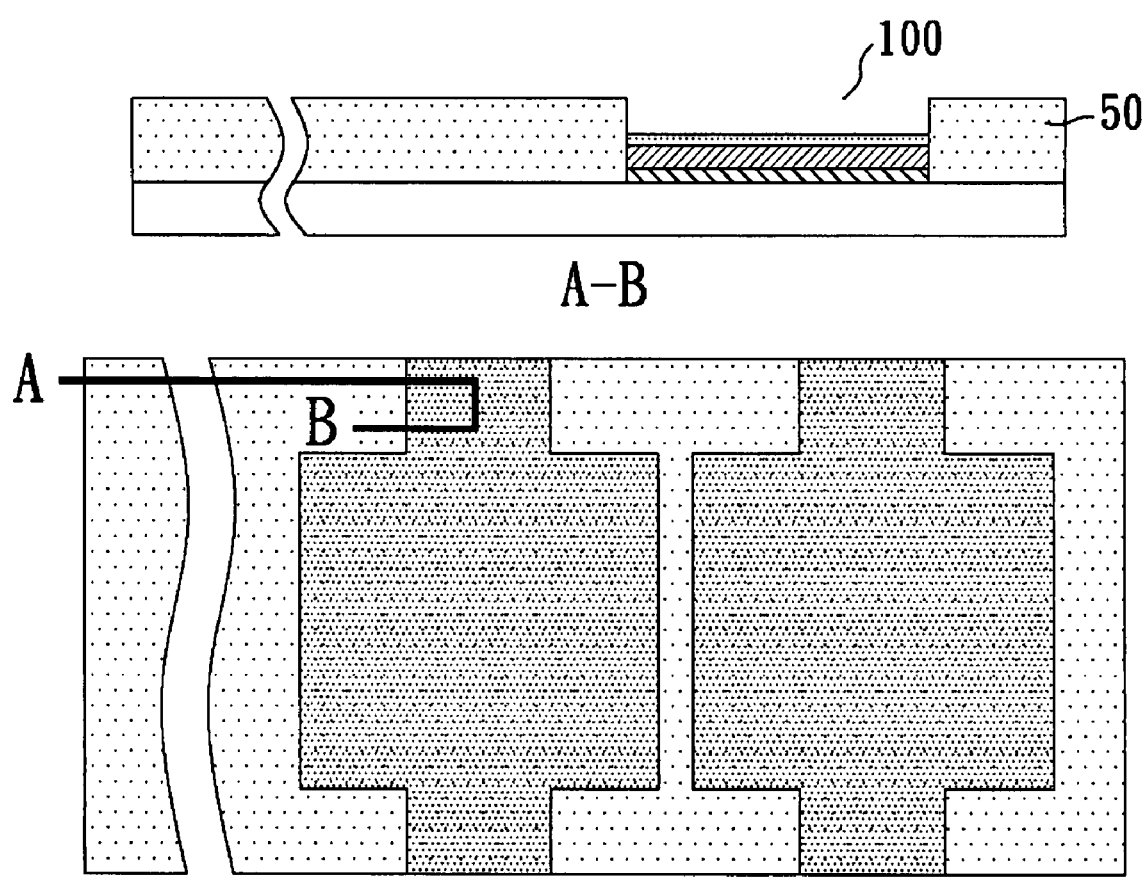

A negative photoresist layer is deposited over the second insulating layer 50 (not shown in FIG. 6D), and then the first metal layer 20 functions as a mask to enable removal of the second insulating layer 50 over the patterned area 100 and expose the patterned area 100 having the TFD structure area and the pixel area by backside exposure, as shown in FIG. 6D.

Figure 6E:
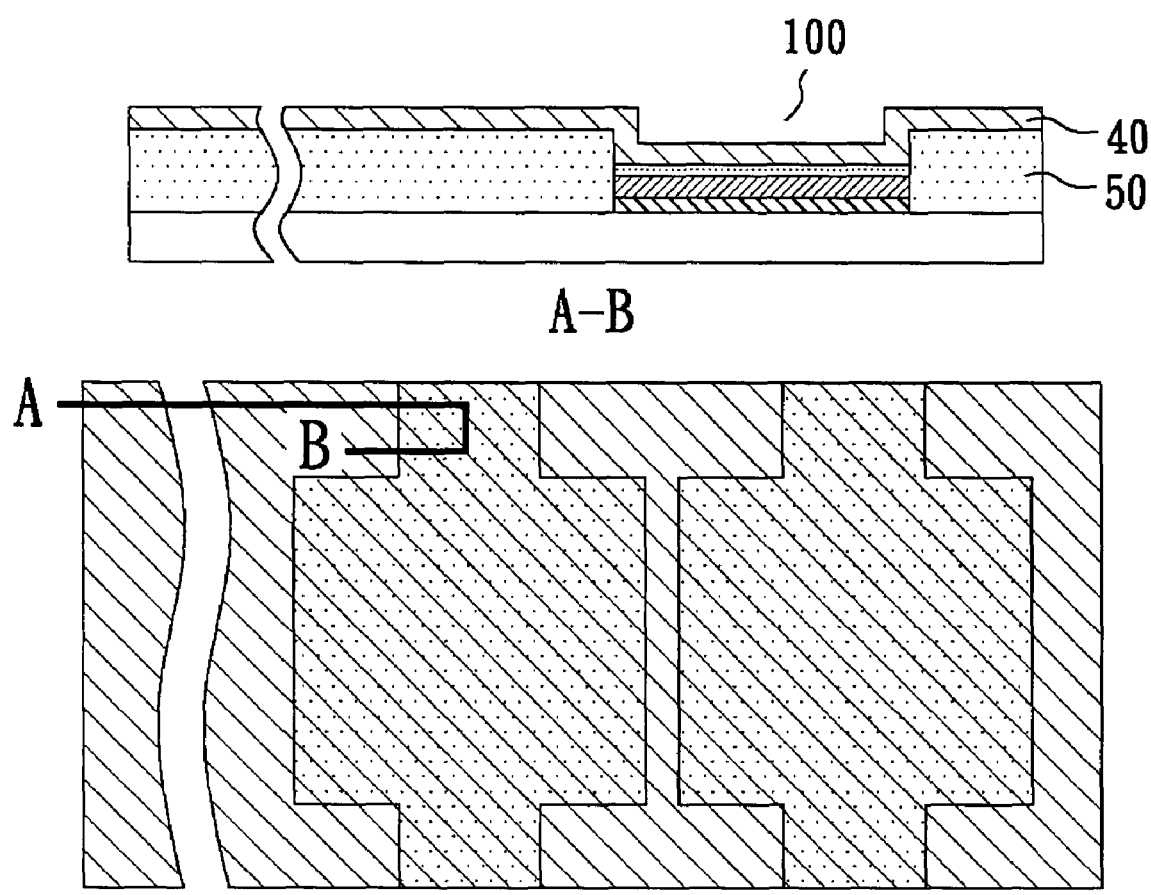
Figure 6F:
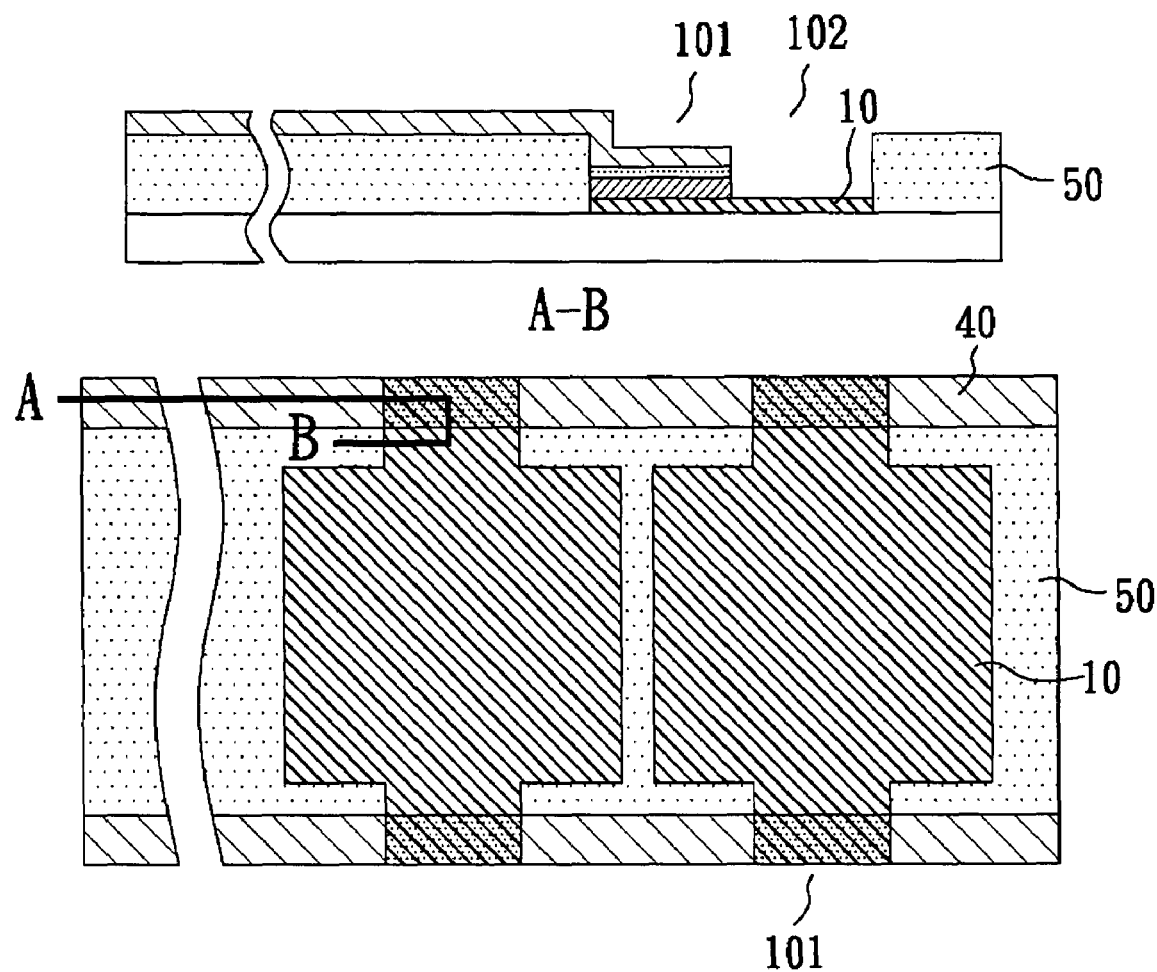

Subsequently, a second metal layer 40 is formed over the substrate 00, as shown in FIG. 6E, and then the TFD structure area 101 and the pixel area 102 are defined by a second mask and etching to accomplish the TFD with the thicker side area, as shown in FIG. 6F.

Embodiment 4

Figure 7A:
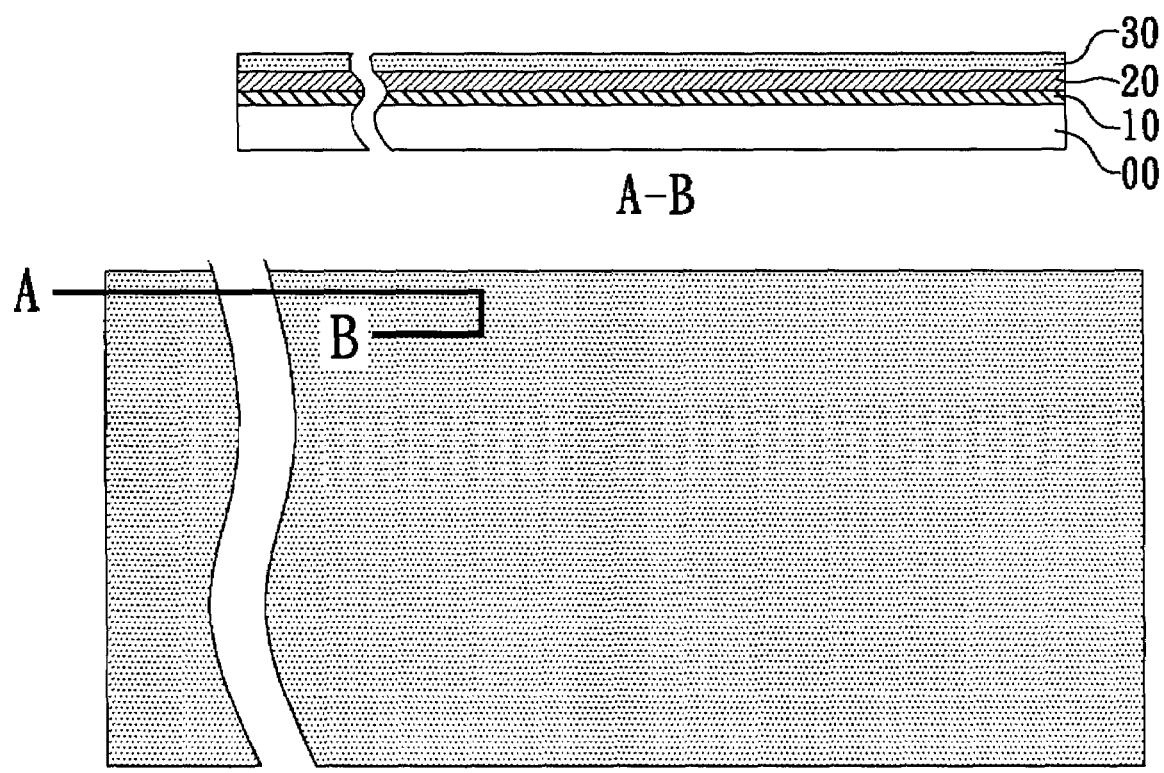
FIGS. 7A to 7F are charts of a manufacturing process of a preferred embodiment (Embodiment 4) of the present invention, wherein the original insulating layer is replaced by a negative photoresist planarization layer.
Figure 7B:
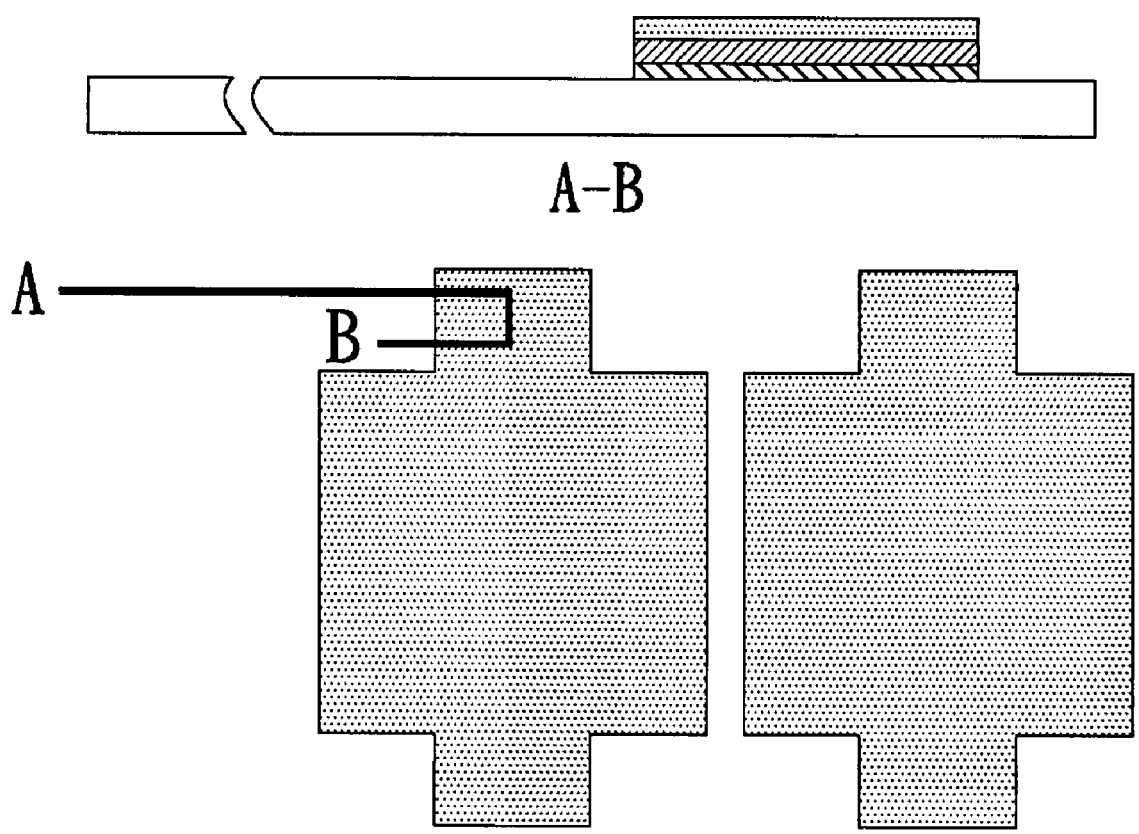
Figure 7C:
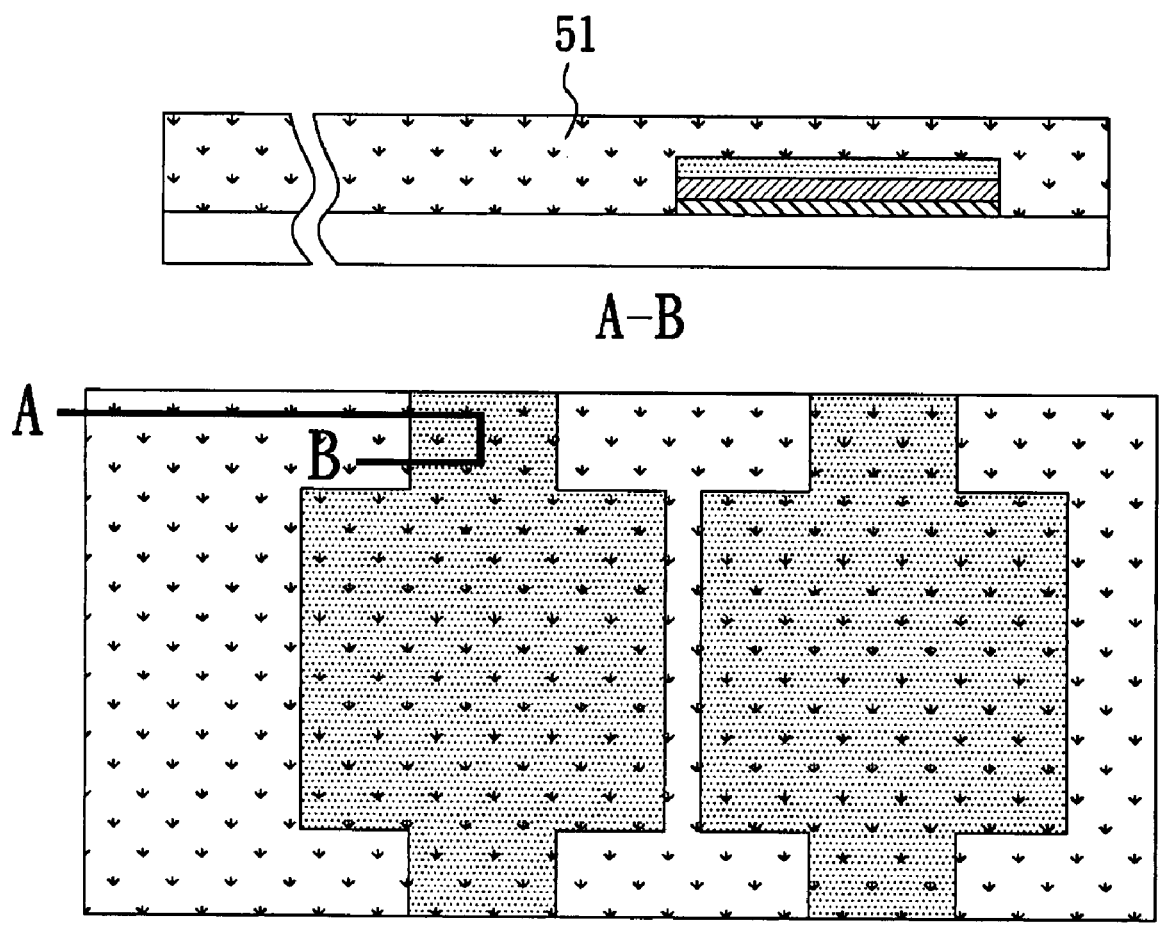
Figure 7D:
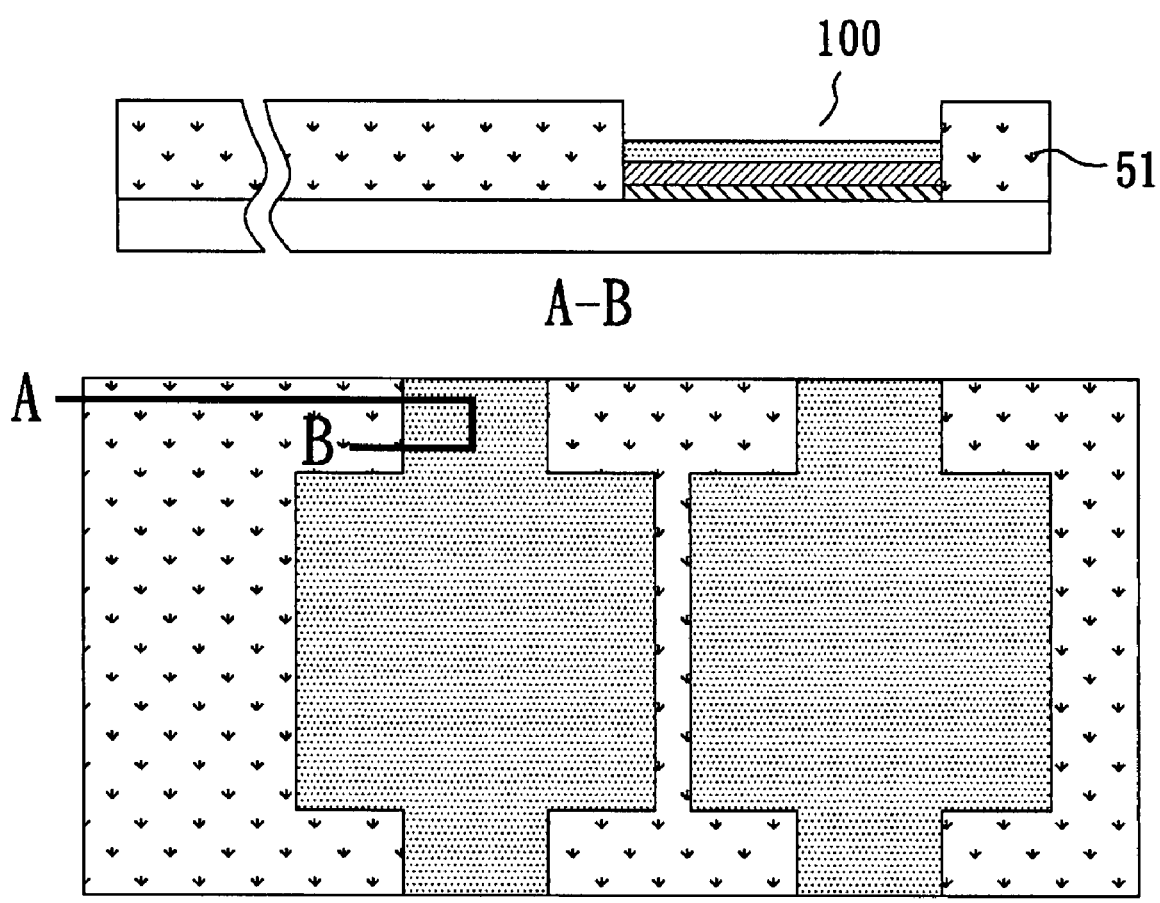
Figure 7E:
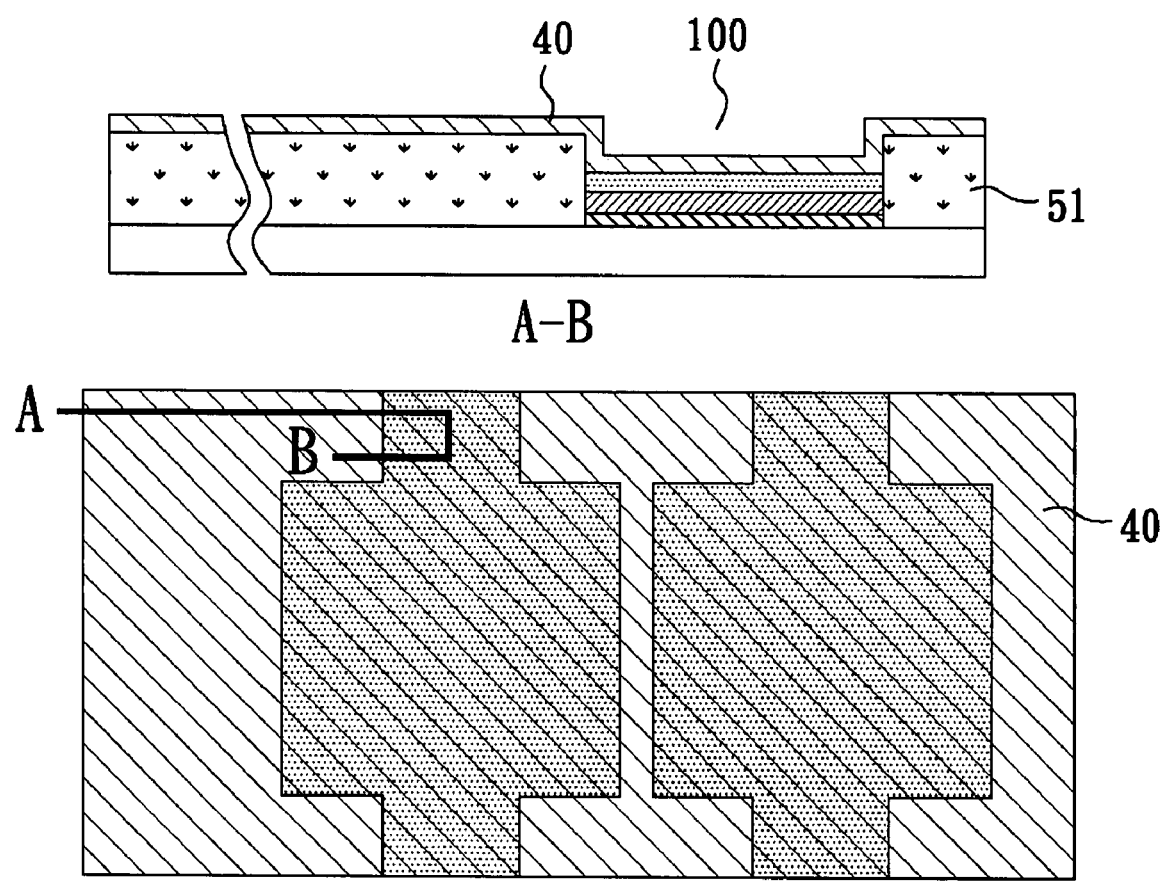
Figure 7F:
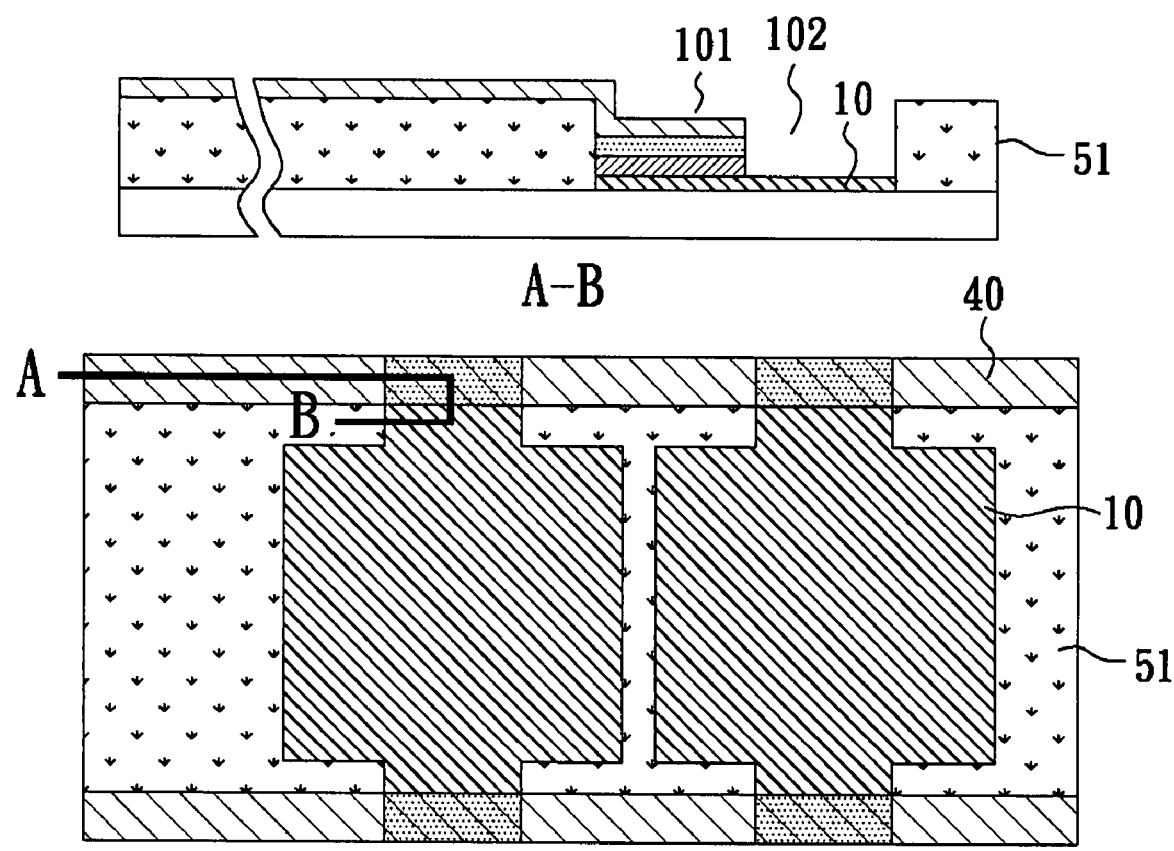

The process of the embodiment is similar to that of Embodiment 3. However, the second insulating layer 50 is replaced by a negative photoresist planarization layer 51, as shown in FIG. 7C. Similarly, the photoresist over the area 100 is removed by backside exposure to expose the area 100 having the TFD structure area and the pixel area, as shown in FIG. 7D. Then, a second metal layer 40 is formed over the substrate 00, as shown in FIG. 7E. Finally, the TFD structure area 101 and the pixel area 102 are defined by a second mask and etching to accomplish the process for preparing the array, as shown in FIG. 7F.

Embodiment 5

Figure 8A:
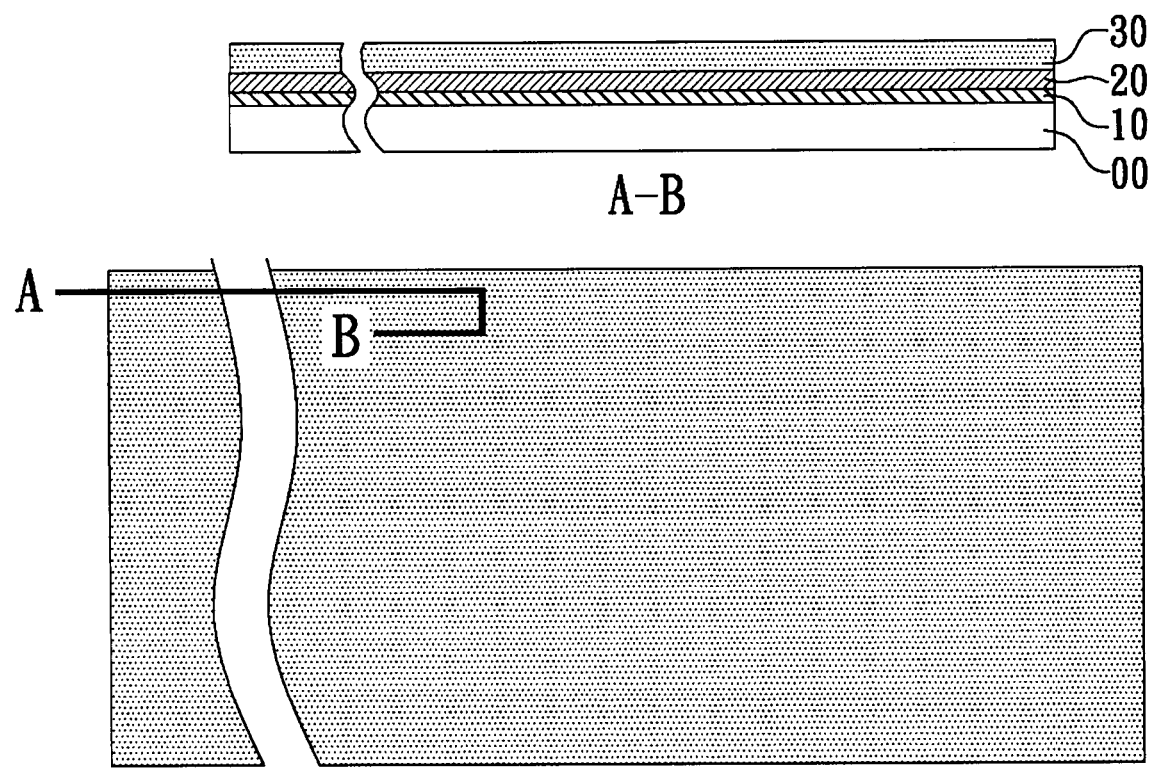
FIGS. 8A to 8F are charts of a manufacturing process of a preferred embodiment (Embodiment 5) of the present invention, wherein the original insulating layer is replaced by an organic positive photoresist layer.
Figure 8B:
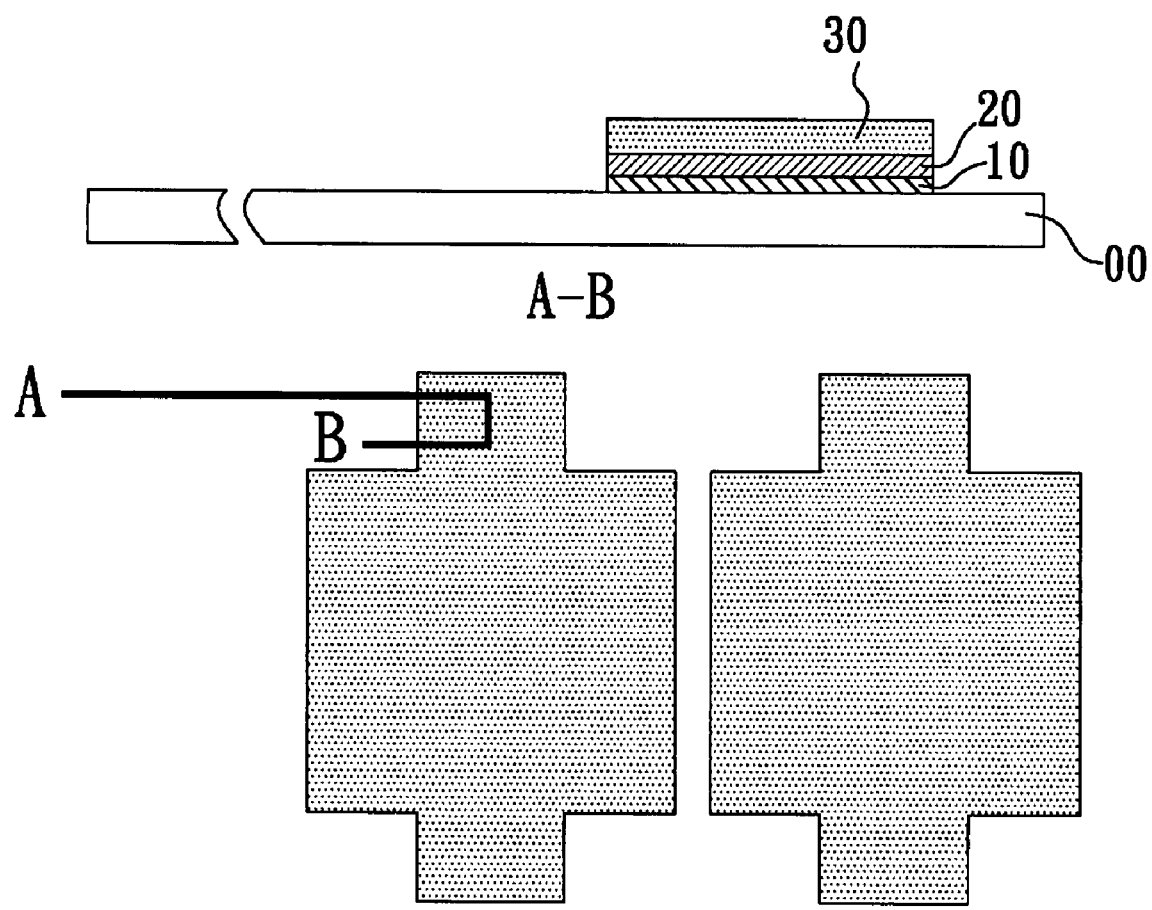
Figure 8C:
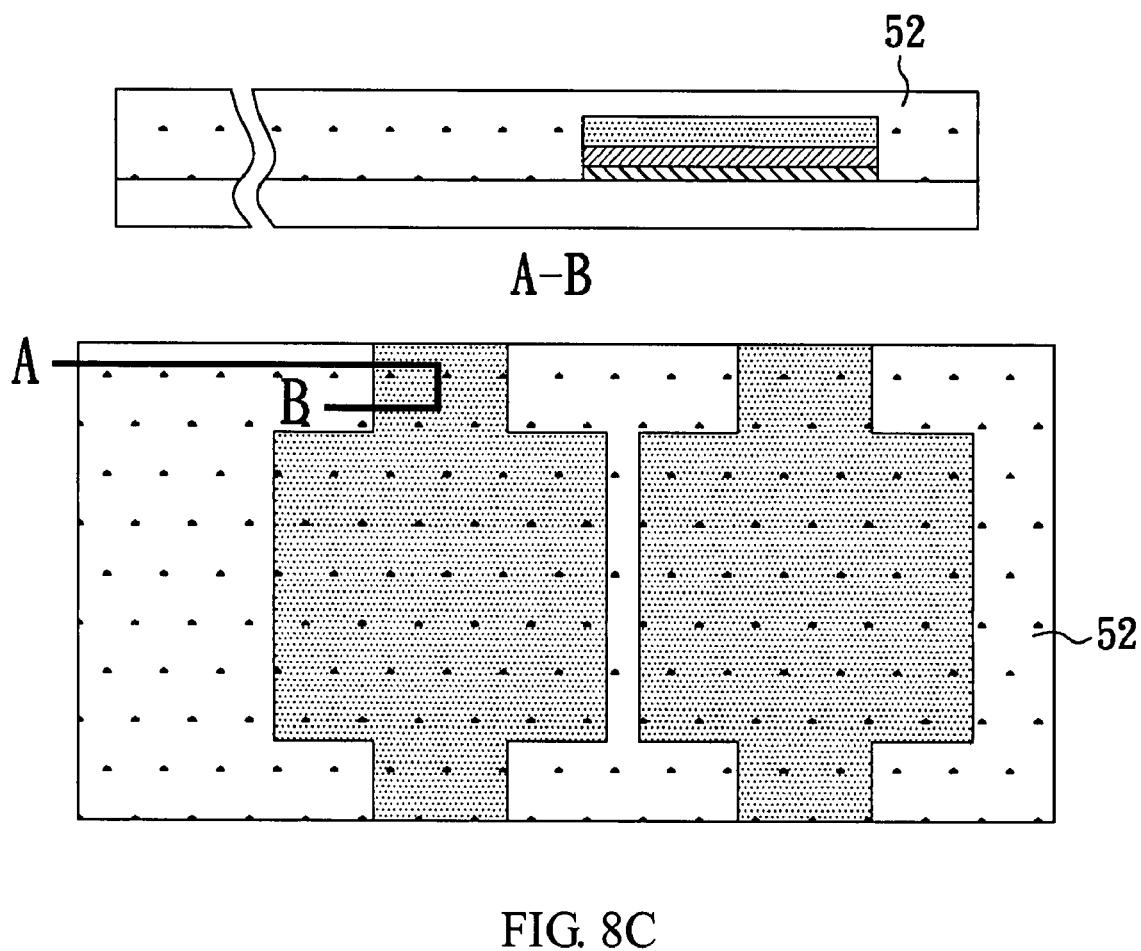
Figure 8D:
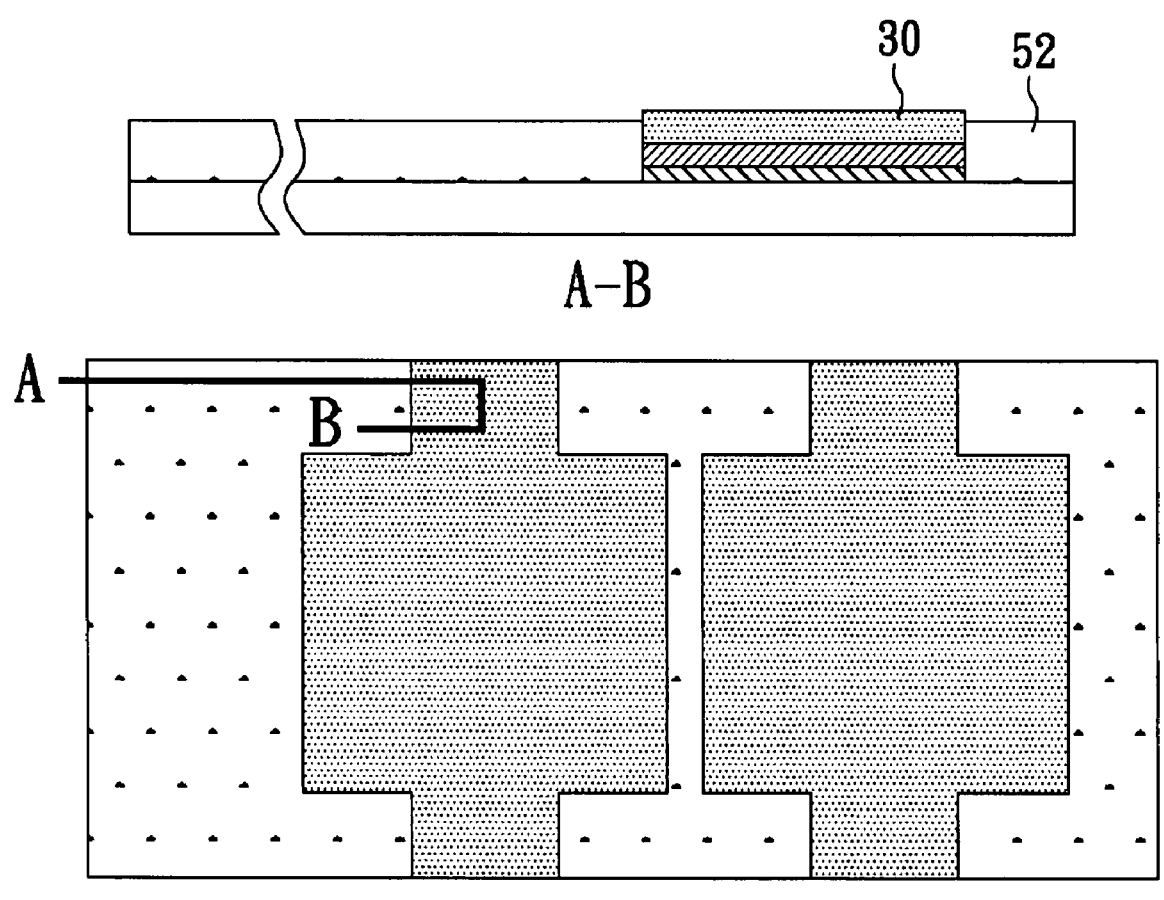

The process of the embodiment is similar to that of Embodiment 3. However, the second insulating layer 50 is replaced by an organic positive photoresist layer 52, as shown in FIG. 8C. Then, the part positive photoresist 52 is removed to reduce the thickness of the positive photoresist layer 52 and make the positive photoresist layer 52 as high as the first insulating layer 30. In order to avoid the organic positive photoresist 52 from remaining on the first insulating layer 30, the duration for removing the photoresist can be extended to make the height of the positive photoresist layer 52 slightly lower than the first insulating layer 30, as shown in FIG. 8D. The first insulating layer 30 of the present embodiment is thicker than that of the aforementioned embodiments to inhibit excessively etching the first insulating layer 30 and thereby affecting the electrical property of the TFD during removing the photoresist.

Figure 8E:
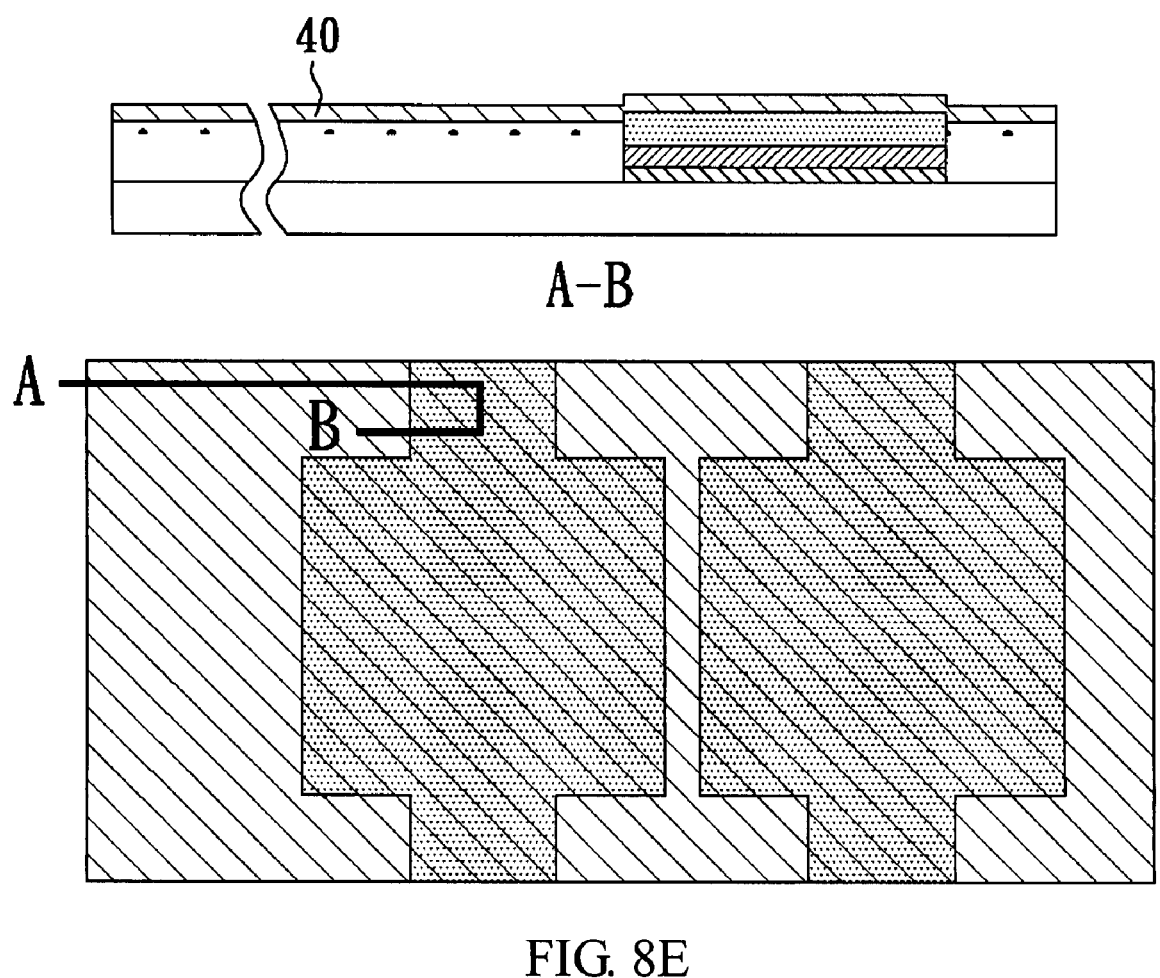
Figure 8F:
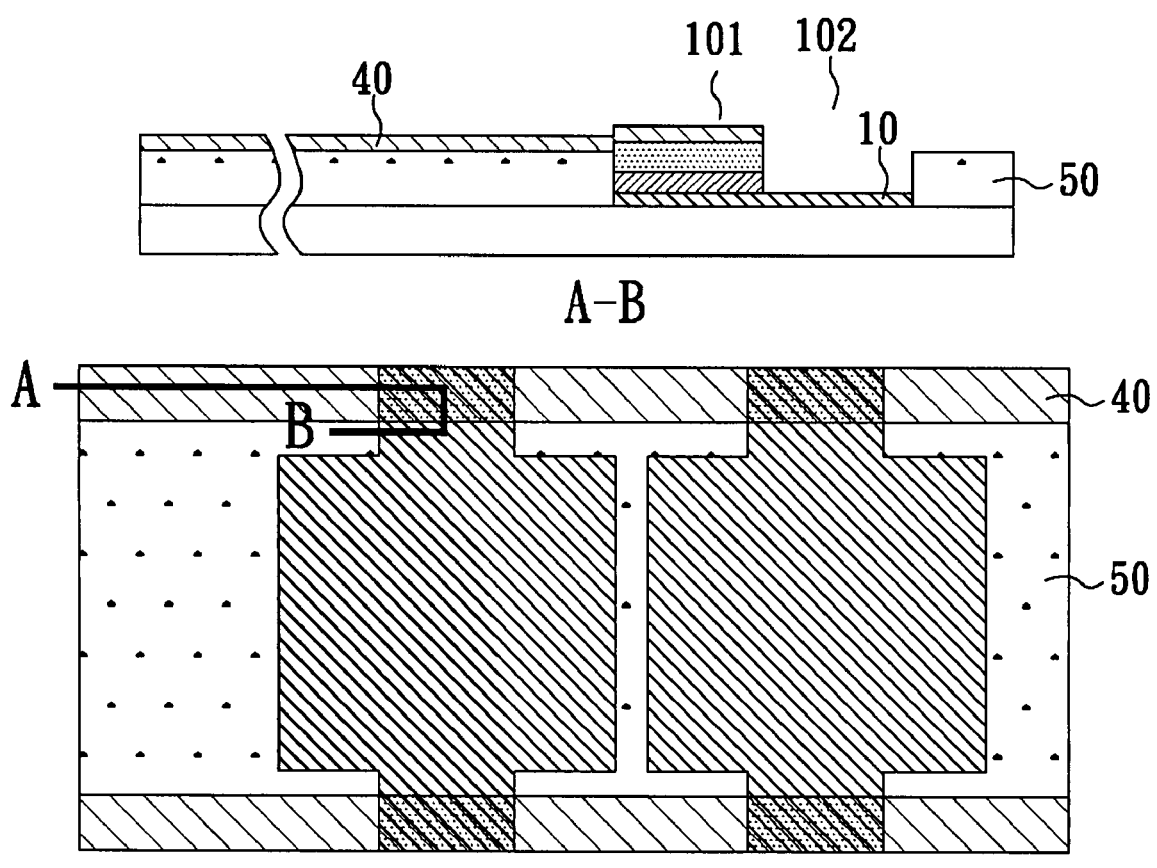

Subsequently, the organic positive photoresist layer 52 is solidified, and then a second metal layer 40 is formed, as shown in FIG. 8E. As shown in FIG. 8F, the TFD structure area 101 and the pixel area 102 are defined by a second mask and etching to accomplish the TFD with the thicker side area.

According to the aforementioned process, the TFD structure can be accomplished by using only two masking steps. In addition, the aperture ratio and the area of the TFD can be enhanced to raise the driven current and accelerate the pixel charging by overlapping the TFD and the selective line.

Although the present invention has been explained in relation to its preferred embodiment, it is to be understood that many other possible modifications and variations can be made without departing from the spirit and scope of the invention as hereinafter claimed.

What is claimed is:

1. A process for manufacturing an LCD device, comprising:
   (a) providing a substrate having a transparent electrode layer and a first metal layer thereon, wherein the transparent electrode layer is sandwiched between the substrate and the first metal layer;
   (b) defining a patterned area having a TFD structure area and a pixel area by use of a first mask;
   (c) forming a first insulating layer and a second metal layer on the substrate in sequence, wherein the first insulating layer is sandwiched between the second metal layer and the first metal layer; and (d) defining the TFD structure area and the pixel area, and removing the first metal layer, the first insulating layer, and the second metal layer on the pixel area to expose the transparent electrode layer by use of a second mask.

2. The method as claimed in claim 1, further comprising a step of forming a second insulating layer on the first metal layer.

3. The method as claimed in claim 1, wherein the material of the transparent electrode layer is comprised of ITO or IZO.

4. The method as claimed in claim 1, wherein the step (b) comprises a step of defining the patterned area having the TFD structure area and the pixel area and a patterned signal line simultaneously.

5. The method as claimed in claim 4, wherein the TFD structure area overlaps a part of the patterned signal line.

6. The method as claimed in claim 4, wherein at least one of the first metal layer and the second metal layer is comprised of metal with low resistance.

7. The method as claimed in claim 6, wherein the metal is tantalum.

8. The method as claimed in claim 1, wherein the material of the first insulating layer comprises SiNx.

9. The method as claimed in claim 1, wherein the TFD structure area overlaps the signal line.

10. A process for manufacturing an LCD device, comprising:
(a) providing a substrate having a transparent electrode layer, a first metal layer and a first insulating layer thereon, wherein the transparent electrode layer is sandwiched between the substrate and the first metal layer, and the first metal layer is sandwiched between the first insulating layer and transparent electrode layer;
(b) defining a patterned area having a TFD structure area and a pixel area by use of a first mask;
(c) forming a second insulating layer and exposing the patterned area having the TFD structure area and the pixel area;
(d) forming a second metal layer over the second insulating layer and the patterned area having the TFD structure area and the pixel area; and
(e) defining the TFD structure area and the pixel area, and removing the second metal layer, the first insulating layer and the first metal layer on the pixel area to expose the transparent electrode layer by use of a second mask.

11. The method as claimed in claim 10, further comprising forming a second insulating layer on the first metal layer.

12. The method as claimed in claim 10, wherein the material of the transparent electrode layer comprises ITO or IZO.

13. The method as claimed in claim 10, wherein the step (b) comprises a step of defining a patterned area having a TFD structure area and a pixel area and a patterned signal line simultaneously.

14. The method as claimed in claim 13, wherein the TFD structure area overlaps a part of the patterned signal line.

15. The method as claimed in claim 10, wherein at least one of the first metal layer and the second metal layer is comprised of metal with low resistance.

16. The method as claimed in claim 15, wherein the metal is tantalum.

17. The method as claimed in claim 10, wherein the material of the first insulating layer comprises SiNx.

18. The method as claimed in claim 10, wherein the process for defining the insulating layer of the step (c) comprises backside exposure to expose the patterned area having the TFD structure area and the pixel area.

19. The method as claimed in claim 10, wherein the material of the insulating layer comprises SiNx, SiO2, positive photoresist, or negative photoresist.

20. The method as claimed in claim 10, wherein the TFD structure area overlaps the signal line.

* * * * *